(12) United States Patent
Suzuki et al.

(10) Patent No.: US 6,417,648 B2
(45) Date of Patent: Jul. 9, 2002

(54) METHOD OF AND APPARATUS FOR IMPLEMENTING CAPACITY ADJUSTMENT IN BATTERY PACK

(75) Inventors: Kouhei Suzuki, Isehara; Masato Origuchi, Atsugi, both of (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 09/892,776

(22) Filed: Jun. 28, 2001

(30) Foreign Application Priority Data

Jun. 28, 2000 (JP) ......................................... 2000-194121
Jun. 28, 2000 (JP) ......................................... 2000-194122

(51) Int. Cl.$^7$ .............................. H02J 7/00; H02J 7/16
(52) U.S. Cl. ....................................................... 320/136
(58) Field of Search ................................ 320/130, 121, 320/135, 136

(56) References Cited

U.S. PATENT DOCUMENTS 6,020,718 A * 2/2000 Ozawa et al. ................ 320/112

\* cited by examiner

Primary Examiner—Gregory J. Toatley, Jr.
(74) Attorney, Agent, or Firm—McDermott, Will & Emery

(57) ABSTRACT

The lowest voltage value among the open circuit voltages at cells constituting a battery pack is set as a capacity adjustment target value. Each cell is discharged over the length of time corresponding to the deviation of its open circuit voltage from the capacity adjustment target value. The voltage at a cell manifesting a voltage reduction that is larger than those at a majority of remaining cells but is still within the normal range is set closer to the level of the voltages at the majority of remaining cells over time. If, on the other hand, an open circuit voltage is lowered to an extent exceeding a first threshold value, from the range set by the cell error decision-making reference value ascertained by averaging the cell voltages excluding the highest voltage value and the lowest voltage value, then the decision is made that an abnormal voltage reduction has occurred.

17 Claims, 16 Drawing Sheets

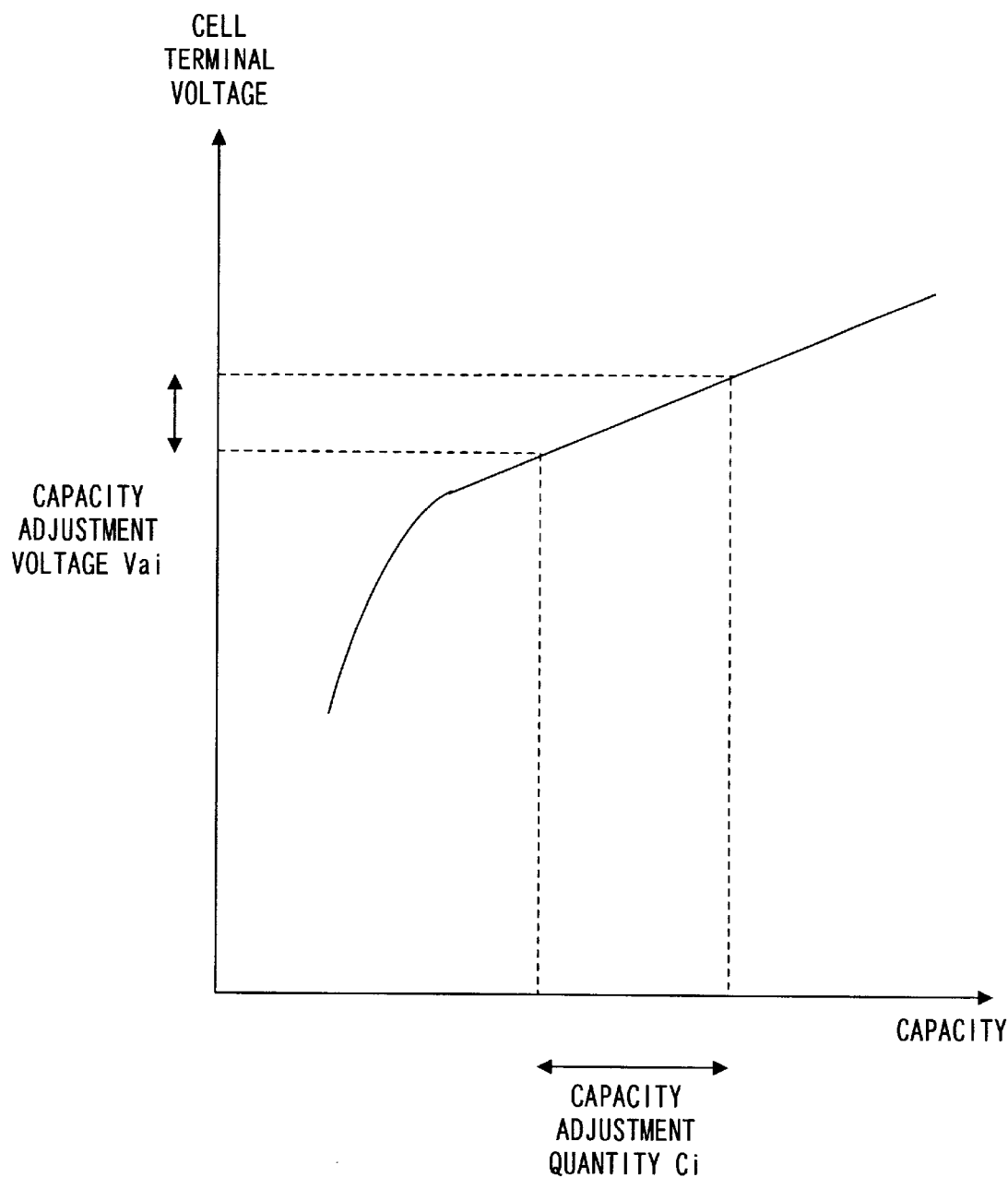

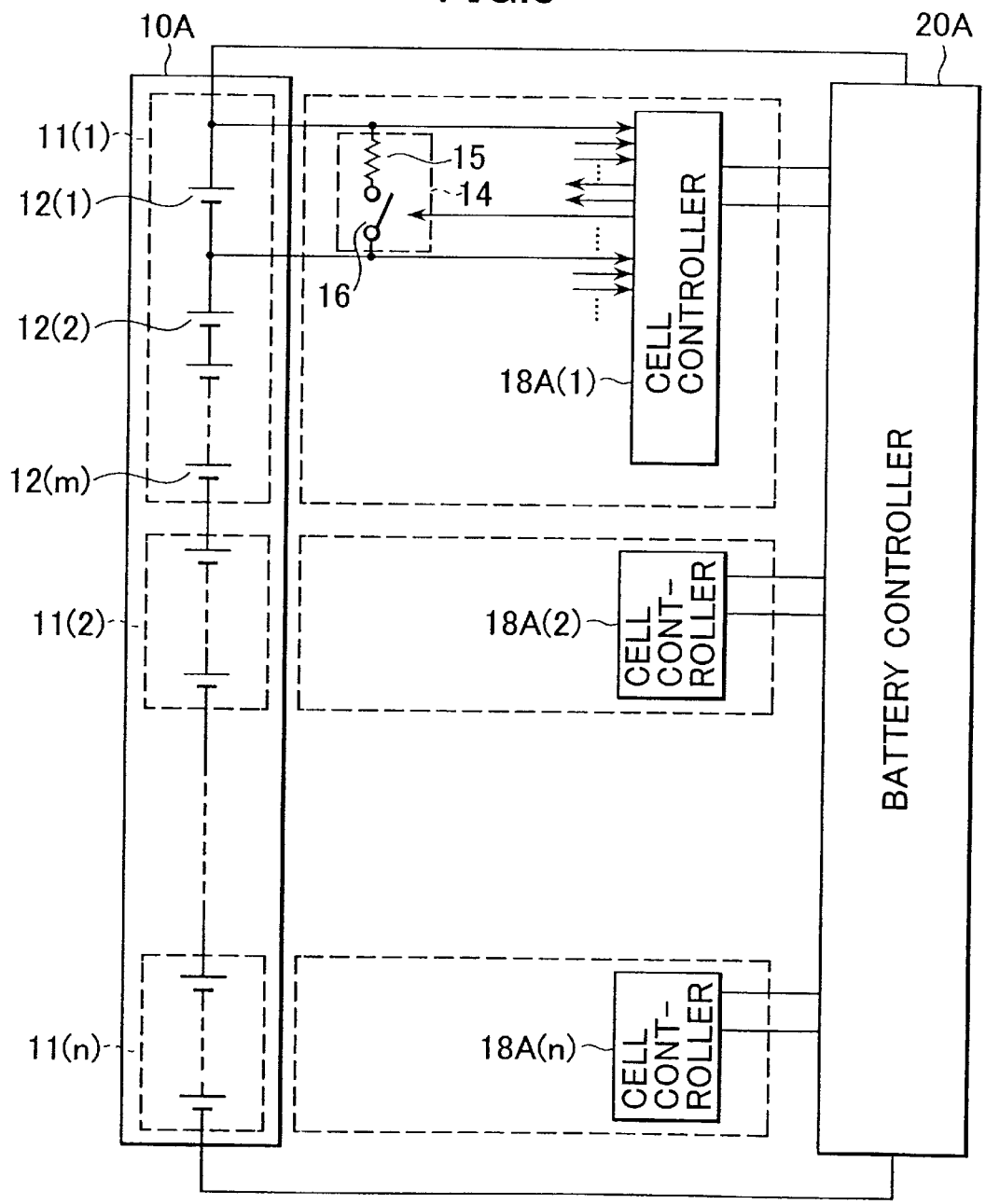

METHOD OF AND APPARATUS FOR IMPLEMENTING CAPACITY ADJUSTMENT IN BATTERY PACK

BACKGROUND OF THE INVENTION

1. Field of the Invention

The present invention relates to a method of and an apparatus for implementing capacity adjustment to correct variations in cell capacities.

2. Description of the Related Art

In a battery pack consisting of multiple cells, the values of the voltages at the individual cells become different from one another due to inconsistency in the levels of self discharge currents at the cells occurring over time and inconsistency in the levels of current consumption at the cell voltage monitoring circuits provided in conjunction with the individual cells. Since a constant proportional relationship is achieved between the battery capacity and the open circuit voltage in the battery pack, inconsistency in the open circuit voltage itself indicates variance in the capacities among the individual cells.

When charging a battery pack, uniformity must be achieved among the capacities of the cells by performing capacity adjustment in correspondence to the deviation in the capacity of each cell.

In a capacity adjustment method in the earlier technology, a capacity adjustment discharge circuit is provided for each cell so that uniformity is achieved among the voltages at the individual cells by using a capacity adjustment target value which is the average of the voltages at all the cells in the battery pack. Namely, while the battery pack is charged/discharged, a cell having a voltage higher than the capacity adjustment target value is discharged in correspondence to the deviation from the voltage capacity adjustment target value, so that the voltage of each cell can be set at the level of the voltage closer to the average voltage in the battery pack.

In this method, a high error criterion level and a low error criterion level each representing a specific value are set relative to the capacity adjustment target value and a decision is made with regard to whether or not there is an error at each cell by judging whether or not the voltage at the cell is beyond either error criterion level during the capacity adjustment.

SUMMARY OF THE INVENTION

However, the capacity adjustment method described above presents a problem in that if there is a cell at which a large voltage reduction relative to the voltage reductions at the remaining majority of cells has occured but is still within the normal range, an erroneous decision may be made that the cell with the relatively large voltage drop is abnormal. This problem is now explained in reference to FIGS. 15A~15C in which Cx indicates the cell with the relatively large voltage reduction. In the figures, ○ indicates the level of the voltage at each cell, and Cx is indicated with the filled circle. FIGS. 15A~15C show changes in the cell voltages occurring over time as indicated by the arrows.

In this method, cells Ca, Cb and Cd with voltages higher than the capacity adjustment target value representing the average voltage of all the cells are discharged as shown in FIG. 15A. While the voltages at the cells except for the cell Cx are adjusted closer to the capacity adjustment target value, the voltage at the cell Cx which is lowered to a larger degree relative to the other cell voltages during the capacity adjustment becomes further deviated from the average voltage of all the cells, as illustrated in FIG. 15B. Thus, the voltage at the cell Cx becomes lower than the error criterion level set at the level lower than the capacity adjustment target value by Vd as shown in FIG. 15C, resulting in an erroneous decision that Cx manifests an abnormality.

In a battery pack provided with capacity adjustment discharge circuits, an error in the capacity adjustment function may occur in any of the cells. This error arises when there is a failure in which a capacity adjustment discharge circuit remains in an OFF state. In this situation, the value of the voltage of the cell, which has the capacity adjustment discharge circuit being in the OFF state, may change while maintaining a specific deviation from the average voltage of all the cells. Therefore, a problem may arise in that if the deviation is equal to or smaller than the Vd representing the error criterion level width, the error cannot be detected. This problem is now explained in reference to FIGS. 16A~16C. In the explanation, it is assumed that a failure has occurred in the capacity adjustment discharge circuit of a cell Cy.

The cells with voltages higher than the average voltage of all the cells representing the capacity adjustment target value alone are discharged. Namely, the cell Cy manifesting a capacity adjustment function error is not discharged although the cells Ca and Cb having voltages higher than the capacity adjustment target value are discharged as shown in FIG. 16A. By the capacity adjustment, the respective cell voltages are shifted as shown in FIG. 16B. It is assumed that the difference between the value of the voltage at the cell Cy and the average voltage of all the cells is equal to or smaller than the error criterion level width Vd when the cell voltages of the other cells excluding that of the cell Cy have been adjusted to the capacity adjustment target value as shown in FIG. 16C. In this situation, unless the voltage drop at the cell Cy has become lowered to an abnormal degree, the voltage of the cell Cy manifesting the capacity adjustment function error changes while sustaining a specific deviation from the average voltage of all the cells. This necessitates a separate detection system to be provided to make a decision as to whether or not an ON/OFF failure or the like has occurred at any of the capacity adjustment discharge circuits.

An object of the present invention is to provide a method of and an apparatus for implementing capacity adjustment on a battery pack, that prevents an erroneous decision from being made with regard to an abnormality manifesting at cells and enables a detection of a capacity adjustment function error without having to provide a separate detection system.

A battery pack for which the capacity adjustment method according to the present invention may be adopted is constructed by connecting in series multiple cells with a discharge circuit provided in conjunction with each cell. In the capacity adjustment method, the discharge process comprises a step in which open circuit voltages at individual cells are monitored over predetermined time intervals, a step in which the characteristic value of the open circuit voltages of the individual cells is set as a capacity adjustment target value, a step in which the length of the adjustment discharge time is determined for each cell based upon the capacity adjustment target value and the open circuit voltage of the cell, and a step in which the cell is discharged over the length of the adjustment discharge time thus determined. The discharge process is executed repeatedly to adjust the capacity of each cell.

A battery pack for which the capacity adjustment method according to the present invention may be adopted is constructed by connecting in series multiple cells with a discharge circuit provided in conjunction with each cell. In the capacity adjustment method, a discharge process comprises a step in which open circuit voltages at individual cells are monitored over predetermined time intervals, a step in which the value of the lowest voltage among the open circuit voltages of the individual cells is set as a capacity adjustment target value, a step in which the length of adjustment discharge time is determined for each cell based upon the capacity adjustment target value and the open circuit voltage of the cell and a step in which the cell is discharged over the length of adjustment discharge time thus determined. The discharge process is executed repeatedly to adjust the capacity of each cell.

A battery pack for which the capacity adjustment apparatus according to the present invention may be adopted contains multiple cells connected in series. The capacity adjustment apparatus comprises a monitoring circuit that monitors open circuit voltages of individual cells over predetermined time intervals, an arithmetic operation circuit that sets the characteristic value of the open circuit voltages at all the cells monitored by the monitoring circuit as a capacity adjustment target value and calculates the length of the adjustment discharge time for each cell based upon the capacity adjustment target value and the open circuit voltage of each cell, and a capacity adjustment discharge circuit that discharges the cell over the length of the adjustment discharge time calculated by the arithmetic operation circuit.

A battery pack for which the capacity adjustment apparatus according to the present invention may be adopted contains multiple cells connected in series and a means of discharging at individual cells. The capacity adjustment apparatus comprises a means of monitoring open circuit voltages of individual cells over specific time intervals, an arithmetic means of setting a characteristic value among the open circuit voltages of the individual cells monitored by said monitoring means as a capacity adjustment target value and calculating the length of the adjustment discharge time for the cells based upon the capacity adjustment target value and the open circuit voltage of the cells, and a capacity adjustment control means for discharging the cells via said discharge means over the adjustment discharge times calculated by said arithmetic means.

A battery pack for which the capacity adjustment apparatus according to the present invention may be adopted contains multiple cells which are connected in series. The capacity adjustment apparatus comprises a monitoring circuit that monitors open circuit voltages of individual cells over predetermined time intervals, an arithmetic operation circuit that sets the value of the lowest voltage among the open circuit voltages at all the cells monitored by the monitoring circuit as a capacity adjustment target value and calculates the length of the adjustment discharge time for each cell based upon the capacity adjustment target value and the open circuit voltage of each cell and a capacity adjustment discharge circuit that discharges the cell over the length of the adjustment discharge time calculated by the arithmetic operation circuit.

In addition, a battery pack for which the capacity adjustment method according to the present invention may be adopted is constituted by connecting in series multiple modules each having multiple cells connected in series with a discharge circuit provided in conjunction with each cell. In this capacity adjustment method, the discharge process comprises a step in which an open circuit voltage at each cell is monitored over predetermined time intervals, a step in which the average of the cell voltages in the module with the lowest module voltage is set as a capacity adjustment target value, a step in which the length of the adjustment discharge time is determined for a given cell based upon the capacity adjustment target value and the open circuit voltage of the cell and a step in which the cell is discharged over the length of the adjustment discharge time thus determined. The discharge process is executed repeatedly to adjust a capacity of each cell.

A battery pack for which the capacity adjustment apparatus according to the present invention may be adopted includes multiple modules connected in series, each constituted by connecting in series multiple cells. The capacity adjustment apparatus comprises a monitoring circuit that monitors open circuit voltages of individual cells over predetermined time intervals, an arithmetic operation circuit that sets the average of the cell voltages in the module with the lowest module voltage as a capacity adjustment target value and calculates the length of adjustment discharge time for each cell based upon the capacity adjustment target value and the open circuit voltage of the cell and a capacity adjustment discharge circuit that discharges the cell over the length of the adjustment discharge time.

BRIEF DESCRIPTION OF THE DRAWINGS

FIG. 4 shows the conversion table used for conversion between the capacity adjustment voltage and the capacity adjustment quantity;

FIG. 8 illustrates the battery pack capacity adjustment apparatus in the second embodiment of the present invention;

DETAILED DESCRIPTION OF THE PREFERRED EMBODIMENTS

A First Embodiment

The following is an explanation of the first embodiment of the method of and the apparatus for implementing the capacity adjustment on a battery pack according to the present invention.

Figure 1:
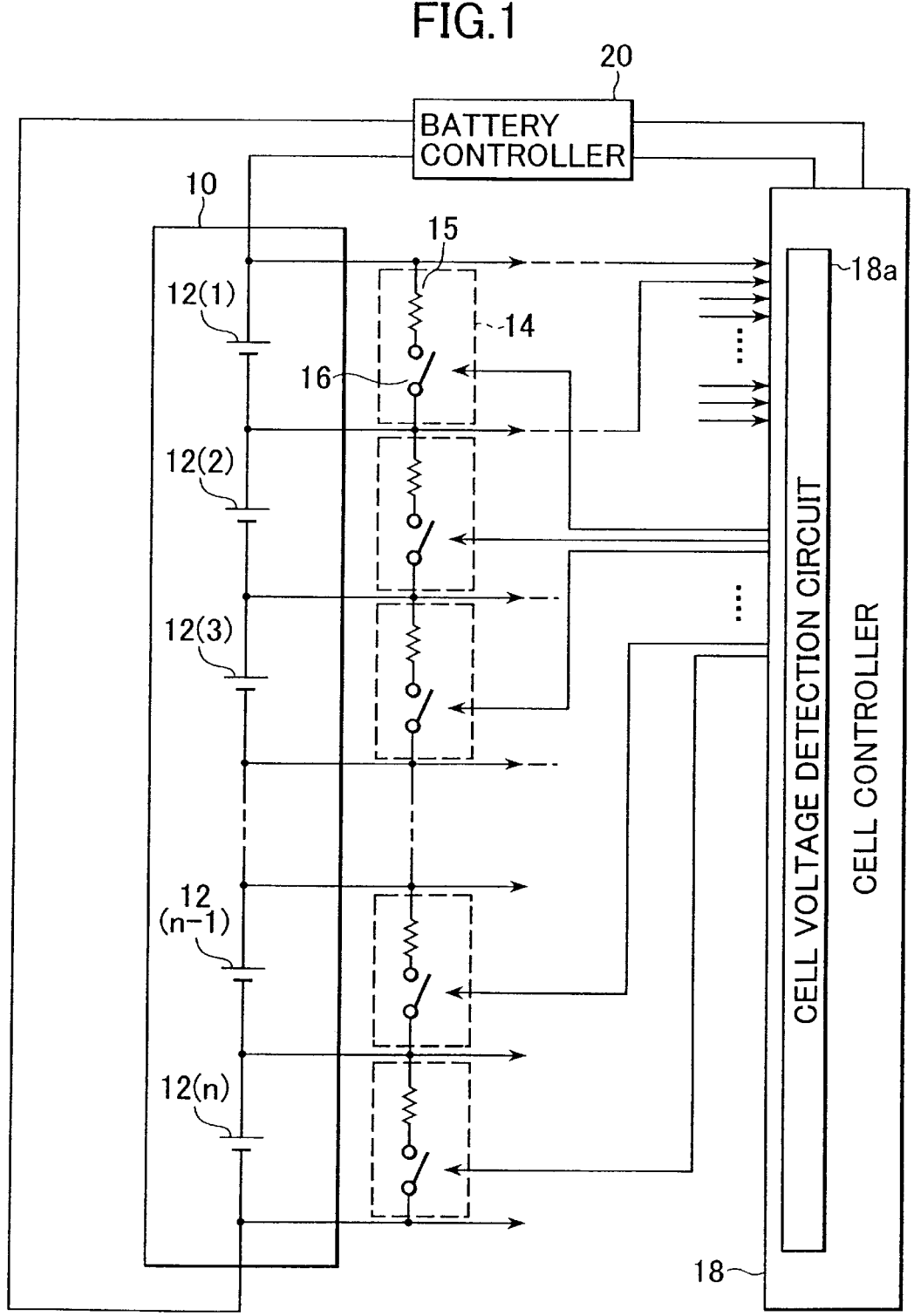
FIG. 1 illustrates the battery pack capacity adjustment apparatus in the first embodiment of the present invention.

FIG. 1 shows the capacity adjustment apparatus according to the first embodiment. A battery pack 10 comprises n cells 12, connected in series with each other. In the figure, the numeral inside each set of parentheses following the reference number 12 which indicates a cell is the cell number.

The two terminals of each cell 12 are connected with a capacity adjustment discharge circuit 14. The capacity adjustment discharge circuit 14, which is constituted of a discharge resistor 15 and a switching circuit 16, adjusts the quantity of electricity discharged at the cell in correspondence to the length of time over which the switch is opened/closed.

The two terminals of each cell 12 are also connected with a cell controller 18. The cell controller 18 includes a cell voltage detection circuit 18a which detects the voltage at each cell. The cell controller 18 is also connected via a communication line to a battery controller 20 internally provided with a charge unit and exchanges various types of information with battery controller 20. The battery controller 20 manages various types of information related to the battery pack such as the battery pack charge/discharge information. The two terminals of the battery pack 10 are connected to the battery controller 20.

It is to be noted that the illustration shows only the two terminals of the cell 12 (1) connected to the cell controller 18 with other connections indicated by arrows for simplification.

During a charge implemented by the battery controller 20 and a discharge implemented by the capacity adjustment discharge circuits 14, the cell controller 18 sequentially detects the open circuit voltages of the individual cells 12 by employing the cell voltage detection circuit 18a. Based upon the characteristic value of open circuit voltages detected, the cell controller 18 sets a capacity adjustment target value Vg. The characteristic value is the lowest voltage value VMIN among the cell voltage values at all the cells constituting the battery pack 10 in this first embodiment. The cell controller 18 calculates the deviation of the voltage of each cell 12 relative to the capacity adjustment target value Vg and calculates the length of adjustment discharge time Tc in correspondence to the calculated deviation. By turning on the corresponding capacity adjustment discharge circuit 14 over the length of adjustment discharge time Tc that has been calculated, a cell with a voltage at a level exceeding the capacity adjustment target value Vg is discharged.

It is to be noted that in the following explanation, the character i (i=1, 2, ... n) is attached whenever necessary to indicate a specific cell.

Figure 2:
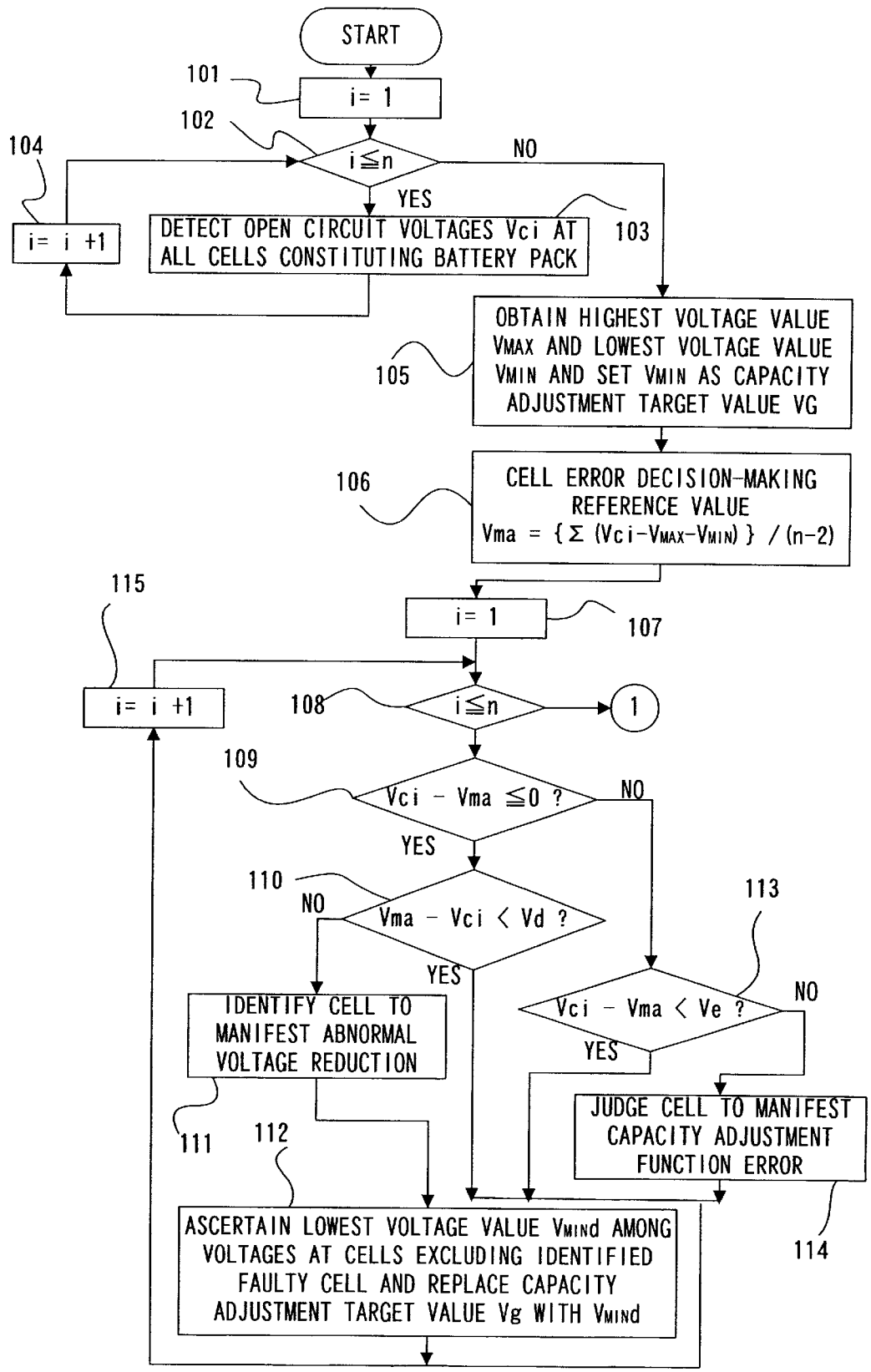
FIG. 2 presents a flow chart of the control procedure implemented in the battery pack capacity adjustment method in the first embodiment.
Figure 3:
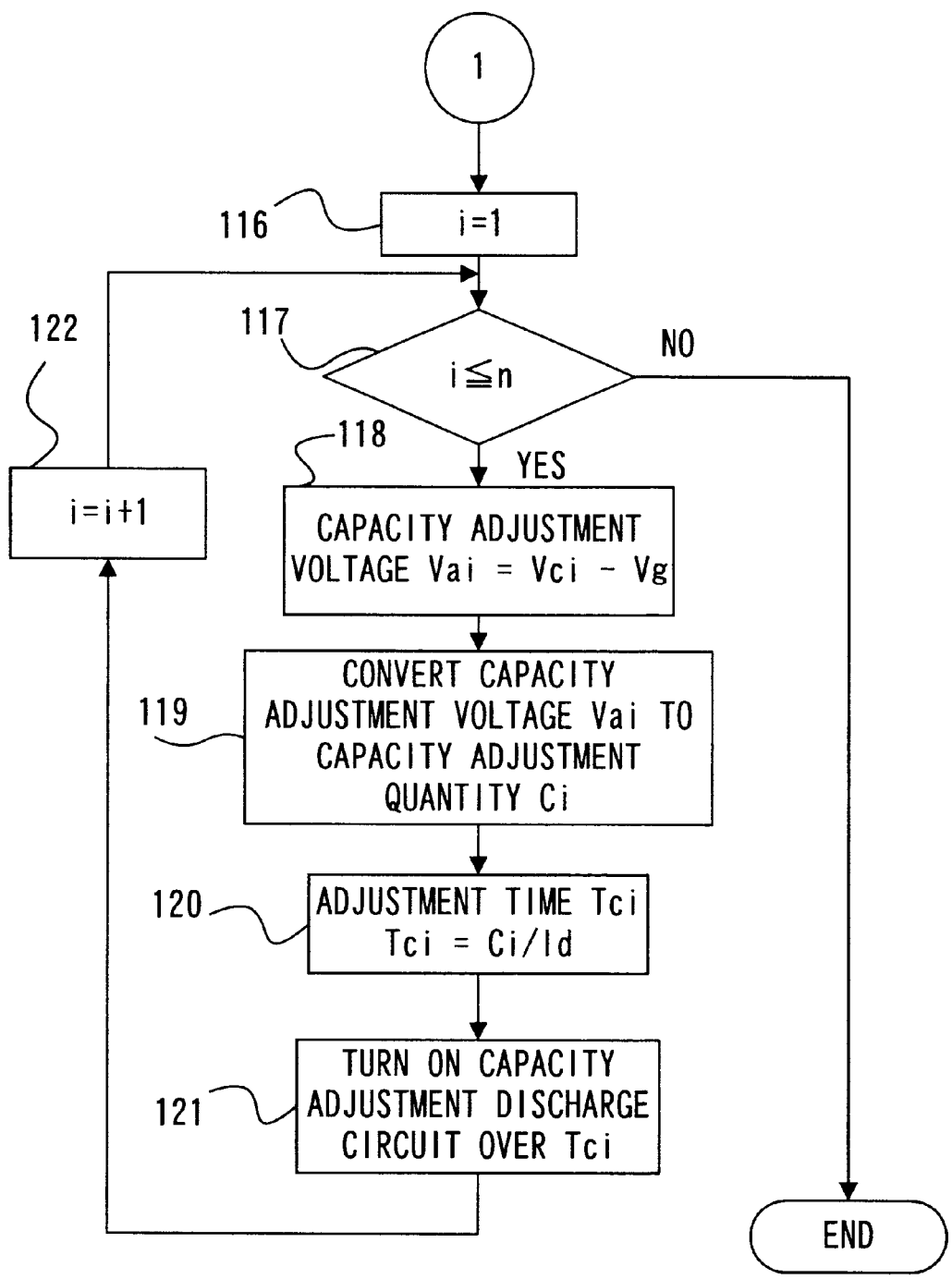
FIG. 3 presents a flow chart showing a continuation of the control procedure implemented in the battery pack capacity adjustment method in FIG. 2.

FIGS. 2 and 3 present a flow chart of the control procedure implemented during a capacity adjustment by the cell controller 18. The procedure is explained below in sequence, starting in step 101.

In step 101, the variable i used to sequentially count the cells 12 in the battery pack 10 is set to 1, and then the operation proceeds to step 102.

In step 102, the variable i is checked to verify that it is equal to or smaller than n representing the total number of cells 12. If the variable i is equal to or smaller than n, the operation proceeds to step 103 to detect the open circuit voltage Vci at the ith cell 12i. In the following step 104, the variable i is increased by 1.

The procedure described above is repeated until the variable i exceeds n, and when the detection of the open circuit voltages Vci of all the cells is completed and the variable i exceeds n, the operation proceeds from step 102 to step 105.

In step 105, the highest voltage value VMAX and the lowest voltage value VMIN among the detected open circuit voltages Vci of the individual cells are solved and the lowest voltage value VMIN is set as a capacity adjustment target value Vg, before the operation proceeds to step 106.

In step 106, the average of the voltages at all the cells (n−2 cells) excluding the cells with the highest voltage VMAX and the lowest voltage VMIN ascertained in step 105 is calculated as a cell error decision-making reference value Vma, and then the operation proceeds to step 107. In the processing implemented in steps 107 through 115, a cell manifesting an abnormal voltage reduction and a capacity adjustment function error are detected.

In step 107, the variable i is reset to 1 before the operation proceeds to step 108. In step 108, the variable i is checked to verify that it is equal to or smaller than n. If the variable i is equal to or smaller than n, the operation proceeds to step 109 to check whether or not the difference between the open circuit voltage Vci at the ith cell 12i and the cell error decision-making reference value Vma is equal to or smaller than 0.

If the difference is equal to or smaller than 0, the operation proceeds to step 110 to check whether or not the value achieved by inverting the difference is smaller than a predetermined first threshold value, i.e., an abnormal voltage reduction decision-making threshold value Vd. If the value achieved by inverting the difference is smaller than the abnormal voltage reduction decision-making threshold value Vd, the operation proceeds to step 115 to increase the variable i by 1 before the operation returns to step 108.

If it is decided in step 110 that the difference between the cell error decision-making reference value Vma and the open circuit voltage Vci is equal to or larger than the abnormal voltage reduction decision-making threshold value Vd, the operation proceeds to step 111. In step 111, the results of the decision-making indicating that the cell 12i has manifested an abnormal voltage reduction are output to the battery controller 20. Then, in step 112, the lowest voltage value VMINd among the voltage values of all the cells excluding the error-manifesting cell 12i is ascertained and the capacity adjustment target value Vg is replaced with the lowest voltage value VMINd before the operation proceeds to step 115.

It is to be noted that the battery controller 20 indicates or display an occurrence of a cell error whenever necessary.

If it is decided in step 109 that the difference between the cell open circuit voltage Vci and the cell error decision-making reference value Vma is not equal to or smaller than 0, the operation proceeds to step 113.

In step 113, the difference is checked to verify that it is smaller than a predetermined second threshold value, i.e., a capacity adjustment function error decision-making threshold value Ve. The operation proceeds to step 115 if the difference is smaller than the capacity adjustment function error decision-making threshold value Ve, whereas the operation proceeds to step 114 if the difference is equal to or larger than the capacity adjustment function error decision-making threshold value Ve.

In step 114, the results of the decision-making indicating that a capacity adjustment function error has occurred at the cell 12i are output to the battery controller 20, and then the operation proceeds to step 115.

After increasing the variable i by 1 in step 115, the operation returns to step 108 and the processing is repeated until the variable i exceeds n. Namely, all the cells are checked to verify that their voltages are within the range of tolerance. If any error is detected, the results of decision-making indicating that an error has occurred are output to the battery controller 20.

Once the variable i exceeds n, the operation proceeds from step 108 to step 116 in FIG. 3. In the processing implemented in steps 116 through 122, cells with voltages higher than the capacity adjustment target value are discharged.

After resetting the variable i to 1 again in step 116, the operation proceeds to step 117. In step 117, the variable i is checked to verify that it is equal to or smaller than n.

If the variable i is determined to be equal to or smaller than n, the operation proceeds to step 118 to calculate the difference between the open circuit voltage Vci of the ith cell 12i and the capacity adjustment target value Vg as a capacity adjustment voltage Vai for the cell. Then, in step 119, the capacity adjustment voltage Vai is converted to a capacity adjustment quantity Ci (Ah) by using a conversion table prepared in advance as shown in FIG. 4. It is to be noted that the capacity adjustment voltage Vai is not converted to a capacity adjustment quantity Ci if the difference between the cell open circuit voltage Vci and the capacity adjustment target value Vg is equal to or smaller than 0.

In the following step 120, the length of adjustment time Tci (h) over which discharge is to be implemented is calculated in correspondence to the capacity adjustment quantity Ci. The length of adjustment time Tci is calculated through the following formula.

$$Tci = Ci/Id$$

It is to be noted that Id in the formula above represents the value of the electric current flowing through the capacity adjustment discharge circuit 14i provided in conjunction with the cell 12i to be discharged and is determined in correspondence to the open circuit voltage of the cell 12i to be discharged and the impedance of the capacity adjustment discharge circuit 14i.

In step 121, the cell voltage (the open circuit voltage Vci) is controlled to match with the capacity adjustment target value Vg through a discharge achieved by turning on the capacity adjustment discharge circuit 14i of the cell to be discharged over the adjustment time Tci. Subsequently, the operation proceeds to step 122 to increase the variable i by 1, before the operation returns to step 117.

The procedure implemented in steps 117 through 122 is repeated until the variable i exceeds n. When the voltage discharge processing on all the cells is completed, the variable i exceeds n and the series of capacity adjustment control (steps 101~122) ends. Then the capacity adjustment control in steps 101~122 is continuously implemented.

An example of changes in the voltages at the individual cells achieved through the capacity adjustment control described above is presented in FIGS. 5A~5C.

Figure 5A:
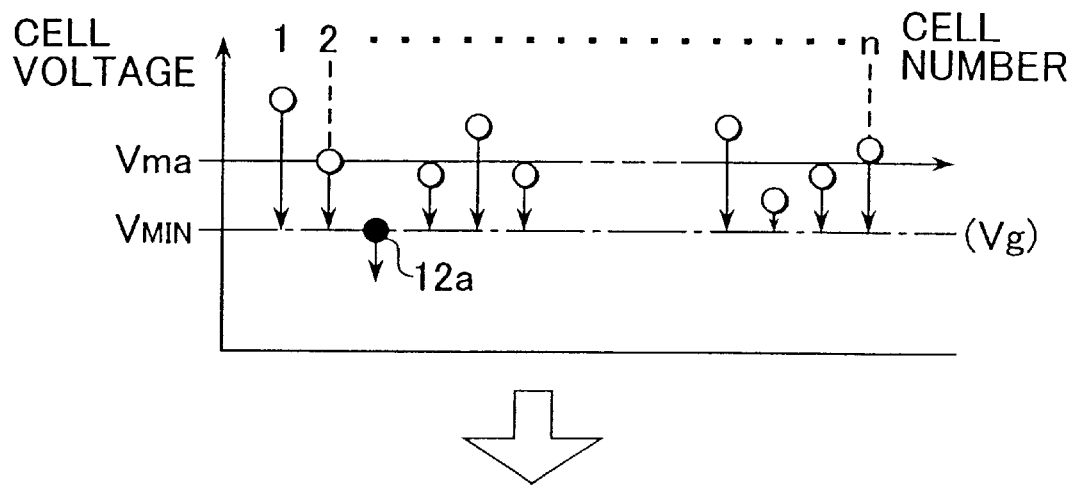
FIGS. 5A~5C show changes in the voltages at the individual cells achieved through capacity adjustment control.
Figure 5B:
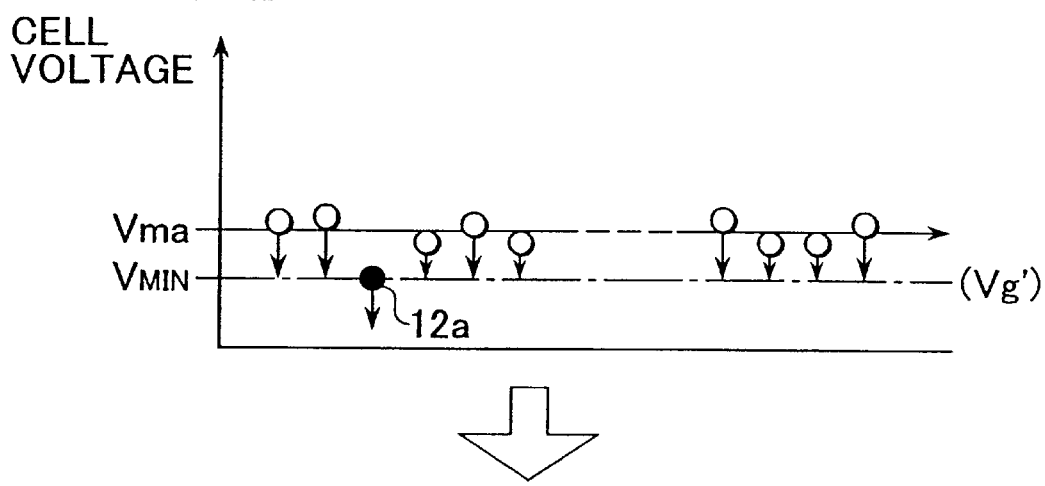

Assuming that the individual cell voltages are distributed as shown in FIG. 5A at the control start, the cell error decision-making reference value Vma is set close to the average of all the cell voltages. The average value VMIN of the cell 12a with the lowest voltage is set as the capacity adjustment target value Vg, and the other cells are individually discharged as necessary over the adjustment times each corresponding to the voltage difference between the voltage at the cell and the capacity adjustment target value Vg. Uniformity of the voltages at all the cells is not achieved after the adjustment implemented through the discharge since the voltage of the cell 12a keeps going down during the capacity adjustment. As a result, the voltages of most cells are adjusted to a substantially uniform level, as shown in FIG. 5B.

A cell 12a indicated by the filled circle in FIG. 5A has the lowest voltage value VMIN. It is assumed that the cell 12a manifests a voltage reduction which is within the normal range but is relatively larger than those manifested at the majority of remaining cells. The voltage at the cell 12a indicated by the filled circles is markedly lower than the voltages at the majority of remaining cells after the adjustment achieved through a discharge, as shown in FIG. 5B. However, since the extent of the voltage reduction is not abnormal, the difference between the voltage at the cell 12a and the cell error decision-making reference value Vma is reduced as compared with the pre-adjustment difference.

Figure 5C:
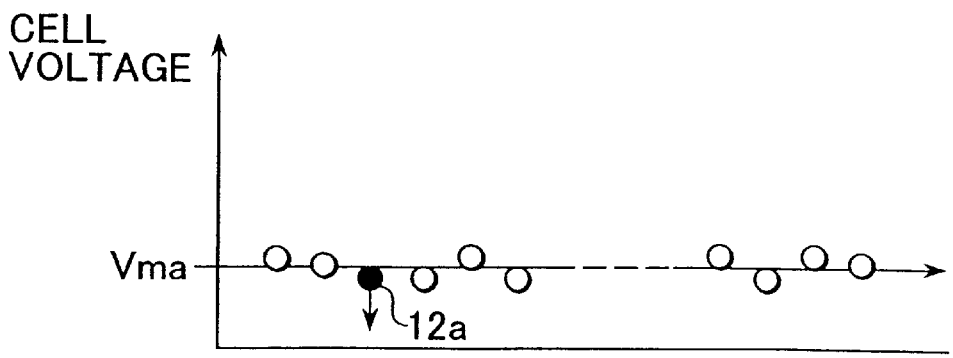

In a similar manner, the value of the voltage at the cell 12a manifesting the lowest voltage value VMIN is set as a new capacity adjustment target value Vg' in the next capacity adjustment. Cells with voltages higher than the capacity adjustment target value Vg' are discharged to match their voltages to the lowest voltage value VMIN. Therefore, the voltage at the cell 12a indicated by the filled circle is adjusted closer to the level of the voltages at the majority of remaining cells as a greater number of subsequent adjustments are implemented, as shown in FIG. 5C. As a result, the cell 12a manifesting a voltage reduction which is larger than those at the other cells but is still within the normal range is not mistakenly judged to be faulty.

Figure 6A:
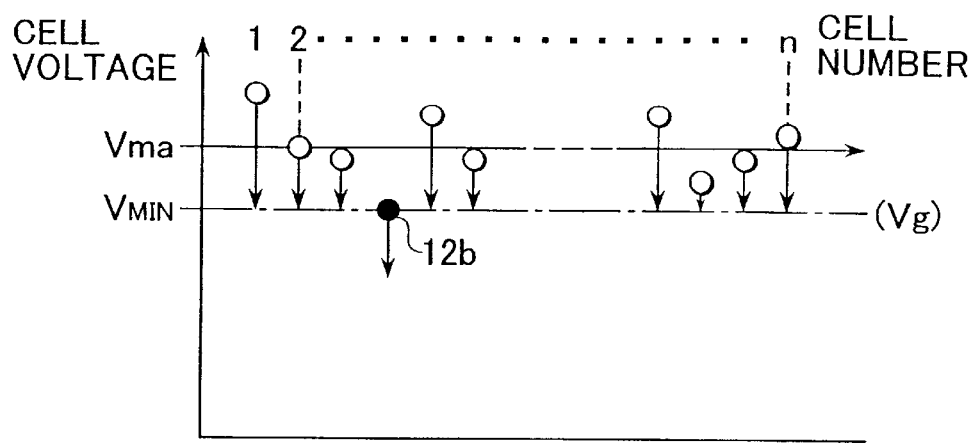
FIGS. 6A~6C show changes in the voltages at the cells occurred when there is a cell manifesting an abnormal voltage reduction.
Figure 6B:
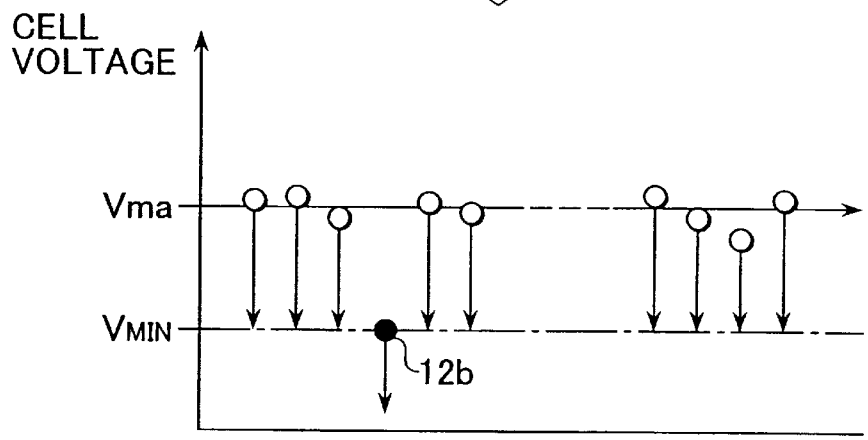

A next explanation will be made on a situation in which a cell 12b corresponding to the lowest voltage value VMIN and indicated by the filled circle in FIG. 6A manifests an abnormal voltage reduction. The voltage at the cell 12b manifesting the lowest voltage value VMIN is set as the capacity adjustment target value Vg and the other cells are individually discharged over individual specific adjustment times. Since the voltage is lowered greatly at the cell 12b, the voltage at the cell 12b becomes reduced to a level even more deviated from the voltage level of the majority of remaining cells, as shown in FIG. 6B.

Figure 6C:
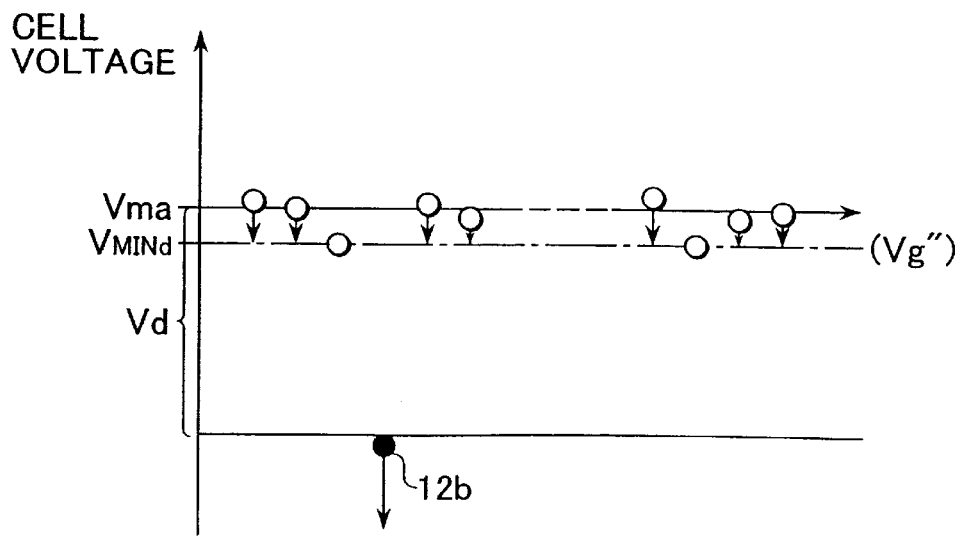

Thus, as a greater number of capacity adjustments are implemented by repeating the processing in steps 101~122, the voltage at the cell 12b manifesting an error, i.e., the cell 12b indicated by the filled circle, further deviates from the cell error decision-making reference value Vma. As a result, the difference between the voltage at the cell 12b and the cell error decision-making reference value Vma exceeds the abnormal voltage reduction decision-making threshold value Vd as shown in FIG. 6C. Thus, the abnormal voltage reduction of the cell 12b can be detected with a high degree of reliability.

It is to be noted that FIG. 6C shows the new lowest voltage value VMINd among the cells excluding the cell 12b manifesting the failure, and this VMINd is set as a new capacity adjustment target value Vg". This prevents an excessive capacity adjustment from being implemented on almost all the cells by using the capacity adjustment target value which is determined by the open circuit voltage at the cell manifesting the abnormal voltage reduction, thereby assuring that a great energy loss does not occur.

Figure 7A:
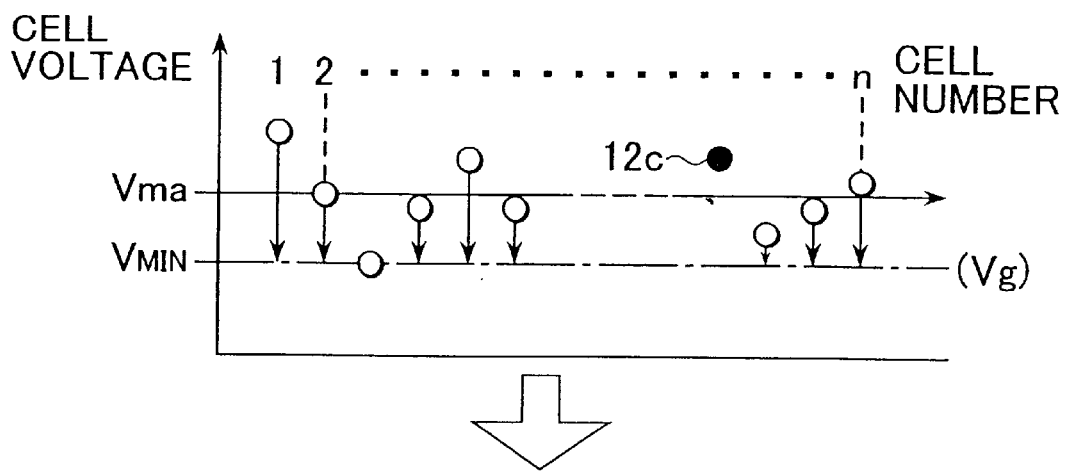
FIGS. 7A~7C show changes in the voltages at the cells achieved when there is a cell manifesting a capacity adjustment function error.

A next explanation will be made on a situation in which a capacity adjustment function error has occurred due to a failure of the capacity adjustment discharge circuit 14 of the cell 12c indicated by the filled circle as shown in FIG. 7A. By setting the lowest voltage value VMIN among the voltage values of all the cells as the capacity adjustment target value Vg, the other cells other than the cell 12c are individually discharged over individual specific adjustment times. While the voltages of the remaining majority of cells are adjusted at a substantially uniform level as shown in FIG. 7B as a result, the voltage at the cell 12c indicated by the filled circle which is not discharged remains at a level above the voltages of the majority of cells.

Figure 7B:
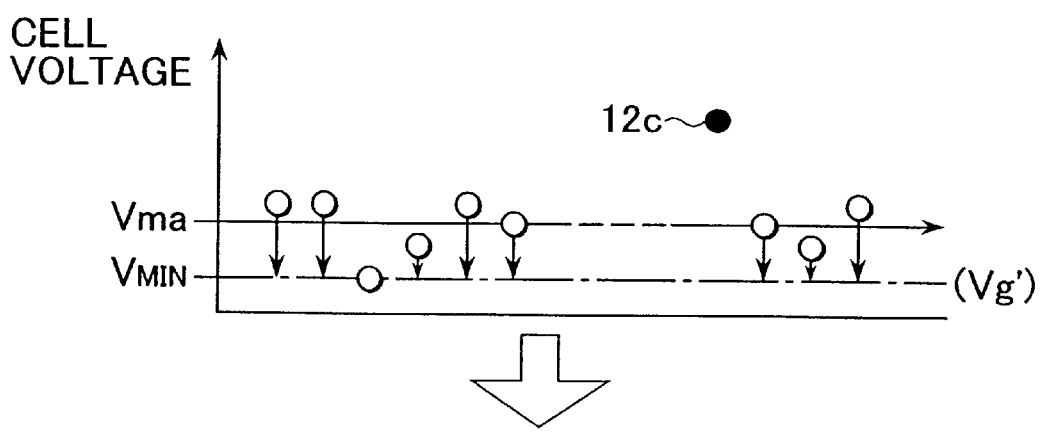
Figure 7C:
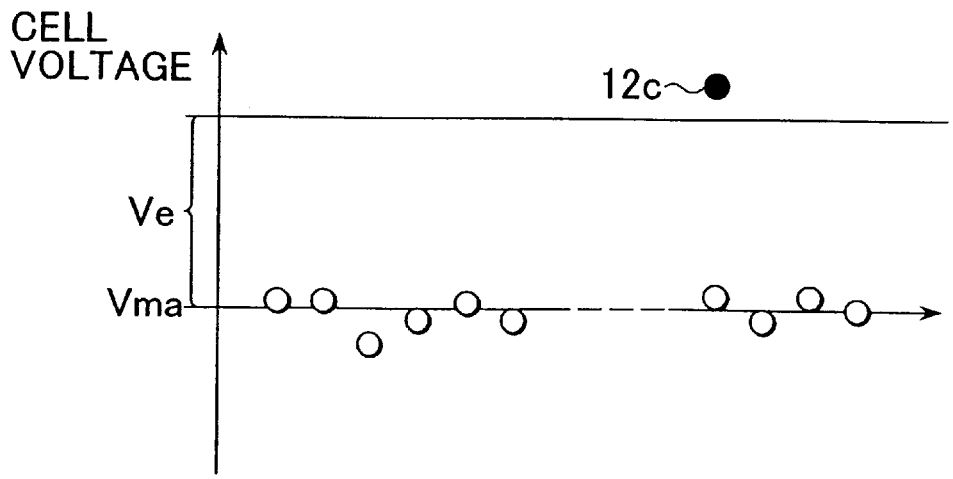

In a similar manner, the lowest voltage value VMIN in the state shown in FIG. 7B is set as a new capacity adjustment target value Vg' for a further adjustment. While the average of the voltages at the cells excluding the cell 12c becomes lower, the difference between the voltage at the cell 12c which remains undischarged and the cell error decision-making reference value Vma increases. Ultimately, the difference between the voltage at the cell 12c and the cell error decision-making reference value Vma exceeds the capacity adjustment function error decision-making threshold value Ve, as illustrated in FIG. 7C, thereby enabling a detection of a capacity adjustment function error.

According to the method of implementing capacity adjustment on the battery pack in the first embodiment, i.e., the battery pack 10 constituted by connecting in series multiple cells 12, the lowest voltage value VMIN among the cell open circuit voltages is set as the capacity adjustment target value Vg and the capacity adjustment discharge circuit 14 provided in conjunction with each cell is turned on over the adjustment discharge time Tc determined in correspondence to the deviation of the cell open circuit voltage from the capacity adjustment target value Vg. Thus, the voltages of the individual cells are adjusted to a uniform level promptly regardless of whether a charge or discharge in battery pack is in progress.

In addition, the average of the voltages at all the cells excluding the cells with the highest voltage value VMAX and the lowest voltage value VMIN is used as the cell error decision-making reference value Vma and it is judged that an error has occurred if the deviation of the voltage at a given cell from the cell error decision-making reference value exceeds a specific threshold value. Thus, a cell manifesting a voltage reduction that is larger than those at the majority of remaining cells but is still within the normal range is not mistakenly judged to be faulty. Furthermore, a cell manifesting a capacity adjustment function error due to a trouble of its capacity adjustment discharge circuit can be detected with a high degree of reliability without having to provide a separate detection system.

Second Embodiment

Next, the second embodiment of the present invention is explained.

FIG. 8 illustrates the capacity adjustment apparatus in the second embodiment. The same reference numbers are assigned to components identical to those of the battery pack capacity adjustment apparatus in the first embodiment illustrated in FIG. 1.

A battery pack 10A in the second embodiment comprises n modules 11 connected in series with each other. Each modules 11 has m cells 12 connected in series.

A capacity adjustment discharge circuit 14 and a cell controller 18A are connected with the two terminals of each of the cells 12 consisting of a module. The second embodiment differs from the first embodiment in the position at which a battery controller 20A is connected. Namely, the battery controller 20A is connected with the cell controllers 18A of the individual modules 11 and is also connected to the two ends of the battery pack 10A.

It is to be noted that the reference number inside each set of parentheses following the reference number 11 indicating a module is the module number, that the reference number inside each set of parentheses following the numeral 12 indicating a cell is the cell number and that the numeral inside each set of parentheses following the numeral 18A indicating a cell controller is the cell controller number.

Each cell controller 18A sequentially ascertains the open circuit voltages (cell voltages) Vc of the individual cells within the corresponding module 11 during a charge or a discharge implemented by battery controller 20A and calculates the total voltage Vj (the total of the cell voltages Vc, which is hereafter referred to as the module voltage) in the module.

At the battery controller 20A, the levels of the module voltages Vj input from the individual modules 11 are compared and the module voltage Vj at the module manifesting the lowest module voltage (the lowest-voltage module) is set as the lowest module voltage value VMIN. Then, the battery controller 20A calculates the average (cell voltage average) Vamin of the voltages at all the cells in the lowest-voltage module.

The battery controller 20A makes a decision with regard to a cell error based upon the cell voltage average Vamin and also sets the characteristic value of open circuit voltages at individual cells as a capacity adjustment target value Vg. The characteristic value is the cell voltage average Vamin in the second embodiment. The battery controller 20A then calculates the length of adjustment discharge time Tc for each cell 12 corresponding to the deviation of the open circuit voltage Vc of the cell 12 from the capacity adjustment target value Vg. Then the battery controller 20A discharges cells with voltages higher than the capacity adjustment target value Vg by turning on the capacity adjustment discharge circuits 14 over the individual adjustment discharge time Tc.

It is to be noted that in the following explanation, individual cells and modules are indicated by attaching characters i (i=1, 2, . . . m) and j (j=1, 2, . . . n) as necessary.

Figure 9:
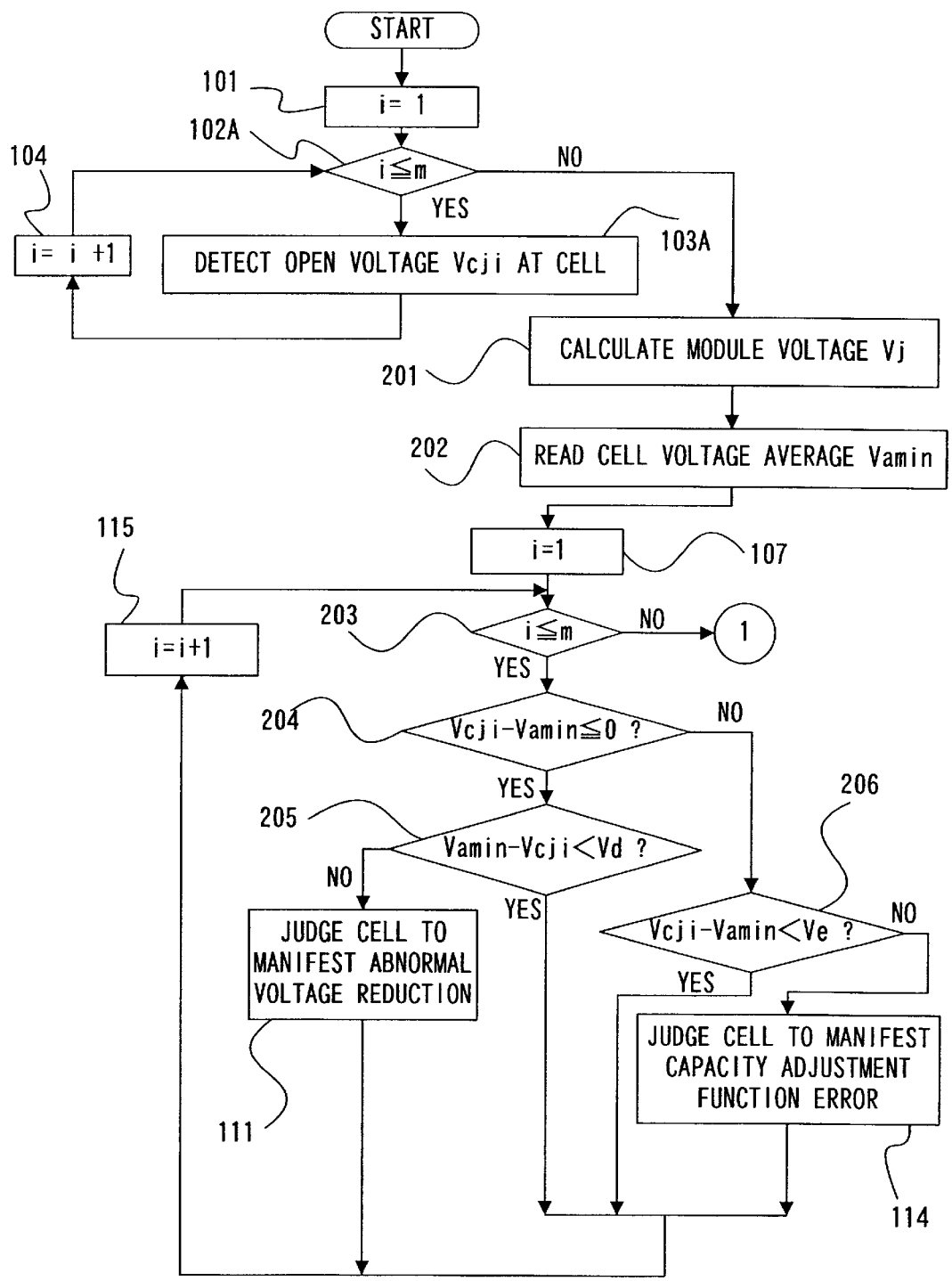
FIG. 9 presents a flow chart of the control procedure executed by a cell controller in the battery pack capacity adjustment method in the second embodiment.
Figure 10:
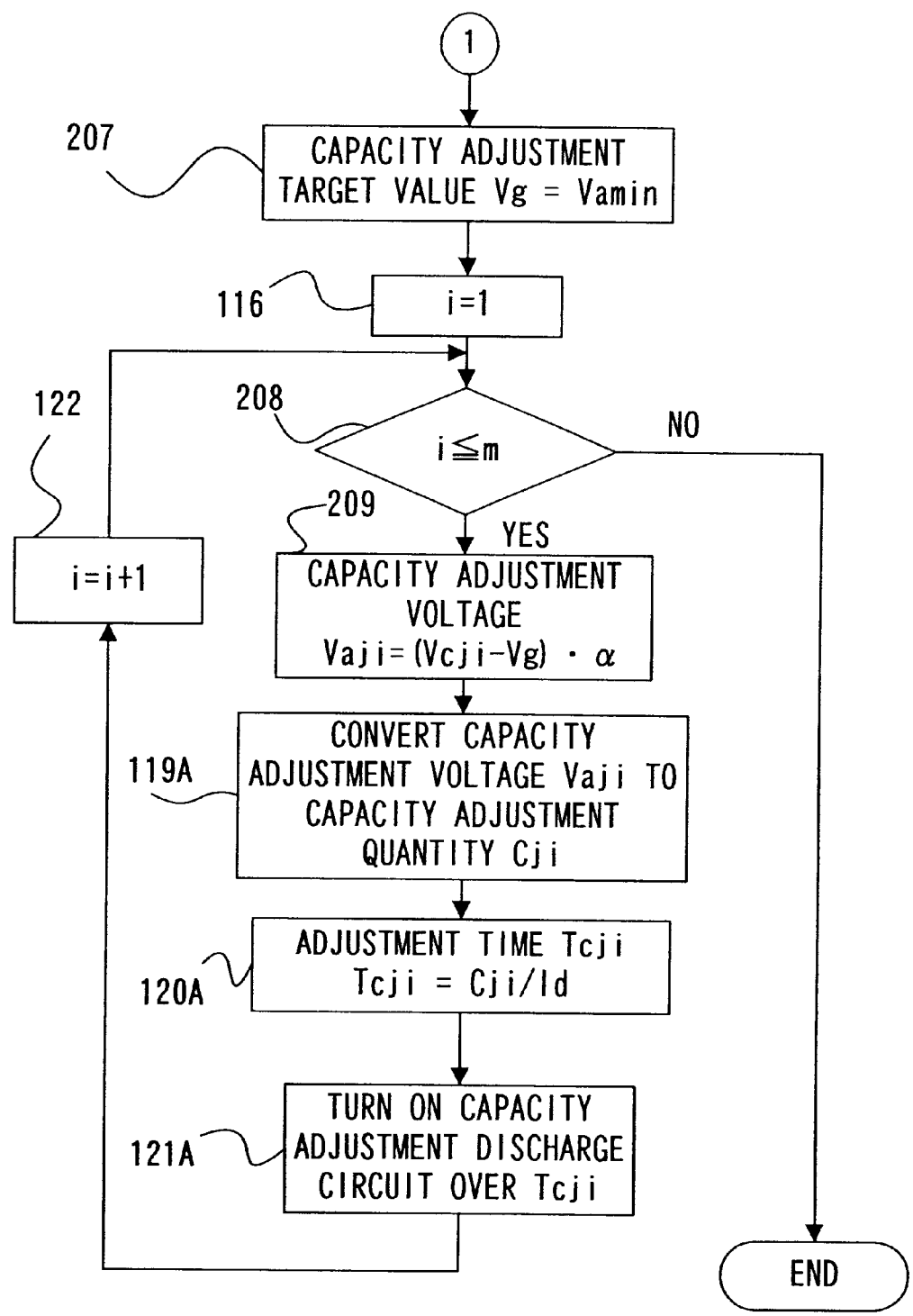
FIG. 10 presents a flow chart showing a continuation of the control procedure executed by the cell controller in the battery pack capacity adjustment method shown in FIG. 9.
Figure 11:
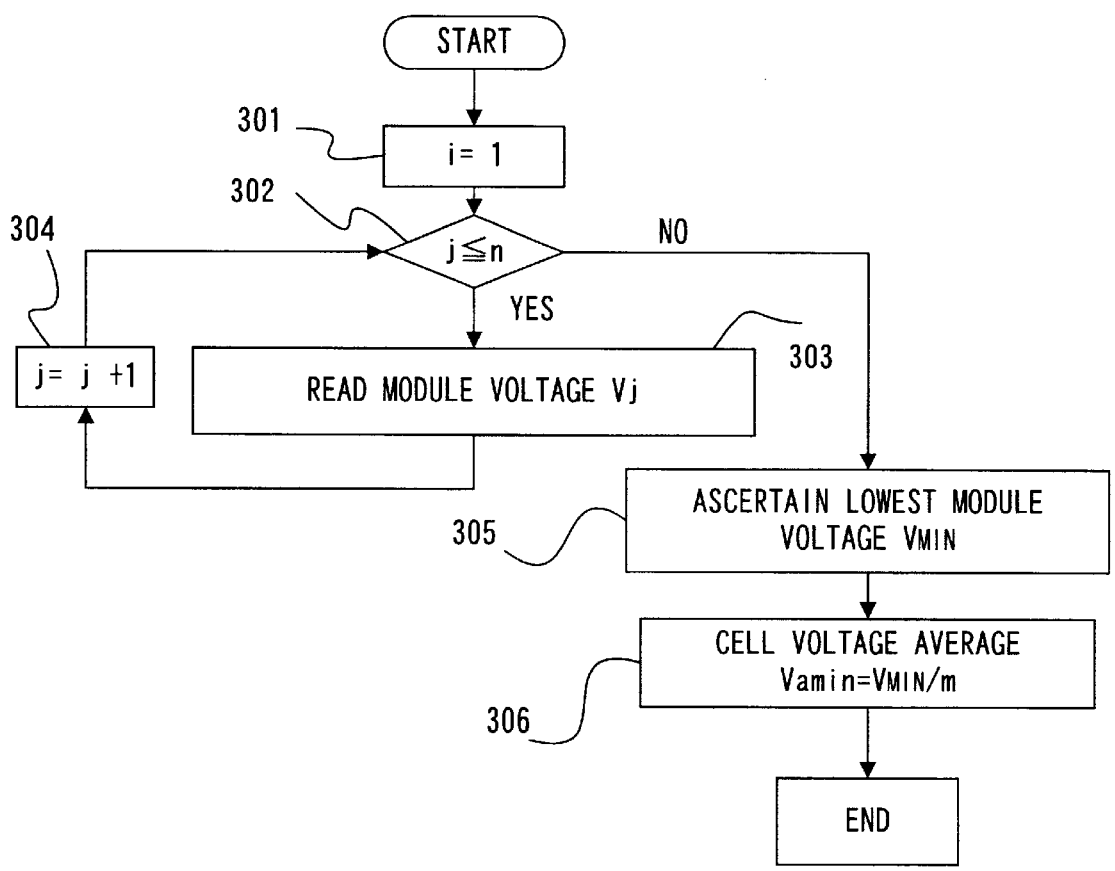
FIG. 11 shows the control procedure implemented by the battery controller in the method of implementing a capacity adjustment on a battery pack in the second embodiment.

FIGS. 9 and 10 present a flow chart of the capacity adjustment control implemented by the cell controller 18A provided for each module and FIG. 11 is a flow chart of the control implemented by the battery controller 20A. The same step numbers are assigned to steps in which processing identical to that explained in reference to the flow chart in FIG. 2 is implemented.

In step 101 in FIG. 9, a variable i used to sequentially count the cells 12ji within a module 11j is set to 1 by each cell controller 18Aj, and then the operation proceeds to step 102A.

In step 102A, a decision is made as to whether or not the variable i is equal to or smaller than m representing the total number of cells 12ji in the module 11j. If a variable i is equal to or smaller than m, the open circuit voltage Vcji at the ith cell 12ji is detected in step 103A and then the variable i is increased by 1 in step 104.

The process described above is repeated until the variable i exceeds m, and when the open circuit voltages Vcji at all the cells in the module 11j have been detected and the variable i exceeds m, the operation proceeds from step 102A to step 201. It is to be noted that the processing described above is separately executed by the cell controllers provided for the individual modules.

In step 201, the module voltage Vj in the module 11j is calculated by adding up the open circuit voltages Vcji of the individual cells that have been detected and the module voltage Vj thus obtained is transmitted to the battery controller 20A. Once the module voltage Vj is ascertained in step 201, the cell voltage average Vamin, which is calculated through the control shown in FIG. 11 implemented by the battery controller 20A, is read in step 202. Once the module voltages Vj have been transmitted from the cell controllers 18Aj of all the modules to the battery controller 20A, the battery controller 20A calculates the cell voltage average Vamin through the following process.

The control implemented by the battery controller 20A is explained below in reference to FIG. 11.

In step 301, a variable j used to sequentially count the modules 11j is set to 1 before the operation proceeds to step 302. In step 302, a decision is made as to whether or not the variable j is equal to or smaller than the total number n of the modules 11j. If it is decided that the variable j is equal to or smaller than n, the module voltage Vj of the jth module is read in step 303. Subsequently, the operation proceeds to step 304 to increase the variable j by 1.

When the module voltages Vj of all the modules 11j have been read by repeating the process described above until the variable j exceeds n, the operation proceeds from step 302 to step 305.

In step 305, the module voltages Vj of the individual modules thus read are compared, the lowest module voltage Vj among the module voltages is ascertained and set as the lowest module voltage value VMIN.

Then, in step 306, the lowest module voltage value VMIN is divided by the number of cells m constituting the module 11 to calculate the cell voltage average Vamin in the lowest-voltage module.

The control executed by the cell controllers 18A starting in step 107 is explained, again in reference to FIG. 9. In the process implemented in step 107 and subsequent steps, each cell controller 18Aj executes cell error decision-making by using the cell voltage average Vamin calculated in the battery controller 20A. The processing preceding step 207 shown in FIG. 10 is implemented concurrently for all the modules.

In step 107, the variable i is reset to 1 before the operation proceeds to step 203. In step 203, the variable i is checked to verify that it is equal to or smaller than m. If the variable i is equal to or smaller than m, the operation proceeds to step 204 to check whether or not the difference between the open circuit voltage Vcji of the ith cell 12ji and the cell voltage average Vamin is equal to or smaller than 0.

If the difference is equal to or smaller than 0 the operation proceeds to step 205 to check whether or not the value achieved by inverting the difference is smaller than a predetermined third threshold value, i.e., an abnormal voltage reduction decision-making threshold value Vd. If the value is smaller than the abnormal voltage reduction decision-making threshold value vd, the variable i is increased by 1 before the operation returns to step 203.

If it is decided in step 205 that the difference between the cell voltage average Vamin and the open circuit voltage Vcji is equal to or larger than the abnormal voltage reduction decision-making threshold value Vd, on the other hand, the operation proceeds to step 111 to output the results of the decision-making indicating that the cell 12ji has manifested an abnormal voltage reduction to the battery controller 20A before proceeding to step 115. It is to be noted that the battery controller 20A indicates an occurrence of cell error on a monitor (not shown) whenever necessary.

If it is decided in step 204 that the difference between the open circuit voltage Vcji of the cell 12ji and the cell voltage average Vamin is not equal to or smaller than 0 the operation proceeds to step 206.

In step 206, the difference is checked to verify that it is smaller than a predetermined fourth threshold value, i.e., a capacity adjustment function error decision-making threshold value Ve. The operation proceeds to step 115 if the difference is smaller than the capacity adjustment function error decision-making threshold value Ve, whereas the operation proceeds to step 114 if it is equal to or larger than the capacity adjustment function error decision-making threshold value Ve.

In step 114, the results of the decision-making indicating that a capacity adjustment function error has occurred at the cell 12ji are output to the battery controller 20A, and then the operation proceeds to step 115. After increasing the variable i by 1 in step 115, the operation returns to step 203 and the processing described above is repeated until the variable i exceeds m.

The processing in steps 204, 205 and 206 described above differs from that implemented in the first embodiment only in that Vamin is used as the cell error decision-making reference value instead of Vma used in the first embodiment.

Once it is decided in step 203 that the variable i has exceeded m, the operation shifts to engage in a capacity adjustment in step 207 in FIG. 10 and subsequent steps. In step 207, each cell controller 18Aj sets the cell voltage average Vamin as the capacity adjustment target value Vg and then the operation proceeds to step 116. In step 116, the variable i is reset to 1 and in next step 208, the variable i is checked to verify that it is equal to or smaller than m.

If i is equal to or smaller than m, the operation proceeds to step 209 in which a capacity adjustment voltage Vaji for the cell is set. The capacity adjustment voltage Vaji is obtained by multiplying the difference between the open circuit voltage Vcji of the ith cell 12ji and the capacity adjustment target value Vg by a predetermined adjustment coefficient α.

The process implemented from step 119A through step 122 is identical to that executed in the first embodiment. The following is a brief explanation. In step 119A, the capacity adjustment voltage Vaji is converted to a capacity adjustment quantity Cji (Ah) by using a conversion table prepared in advance as shown in FIG. 4. It is to be noted that the capacity adjustment voltage Vaji is not converted to the capacity adjustment quantity Cji if the difference between the open circuit voltage Vcji at the cell and the capacity adjustment target value Vg is equal to or smaller than 0.

In step 120A, the length of adjustment time Tcji (h) corresponding to the capacity adjustment quantity Cji is calculated. The adjustment time Tcji is calculated through the following formula.

$$Tcji = Cji/Id$$

In step 121A, the capacity adjustment discharge circuit 14ji of the cell is turned on over the adjustment time Tcji to start a discharge to match the cell voltage (the open circuit voltage Vcji) to the capacity adjustment target value Vg. Subsequently, after increasing the variable i by 1 in step 122, the operation returns to step 208.

It is to be noted that as explained earlier, the capacity adjustment voltage Vaji is not converted to the capacity adjustment quantity Cji if the difference between the open circuit voltage Vcji of the cell and the capacity adjustment target value Vg is equal to or smaller than 0 and, consequently, the corresponding capacity adjustment discharge circuit remains in an OFF state and the cell is not discharged.

The control ends once the variable i exceeds m after repeating the process from step 208 through step 122. It is to be noted that the capacity adjustment processing implemented in step 207 through step 122 is executed in parallel at the individual modules. As a result, the overall length of processing time is reduced.

Figure 12A:
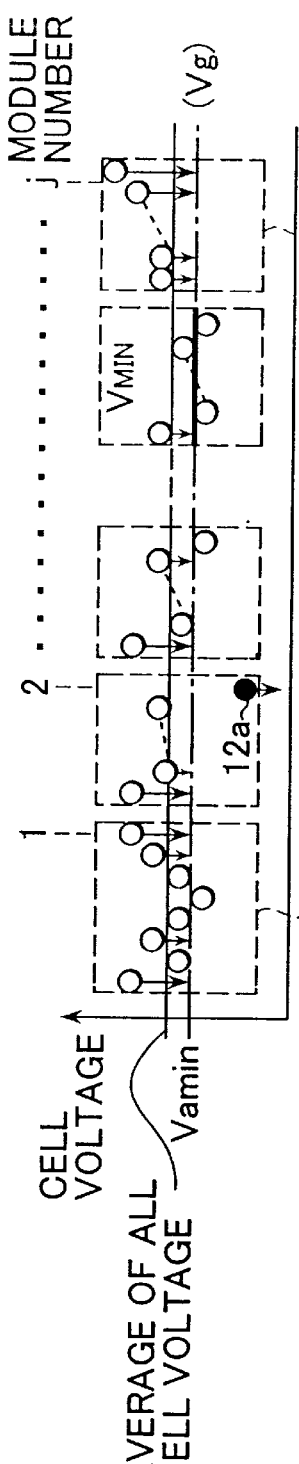
FIGS. 12A~12C show changes in the voltages at the individual cells achieved through the battery pack capacity adjustment control in the second embodiment.
Figure 12B:
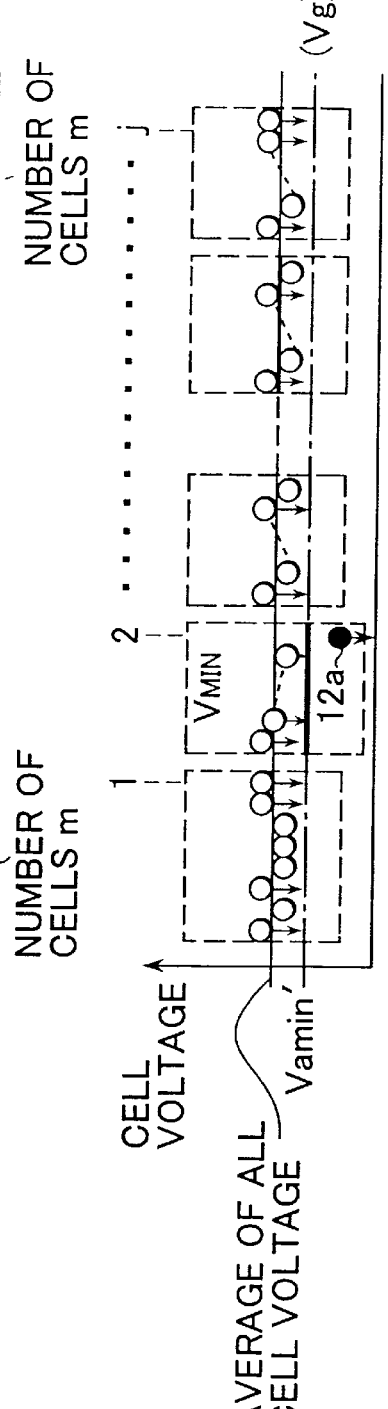
Figure 12C:
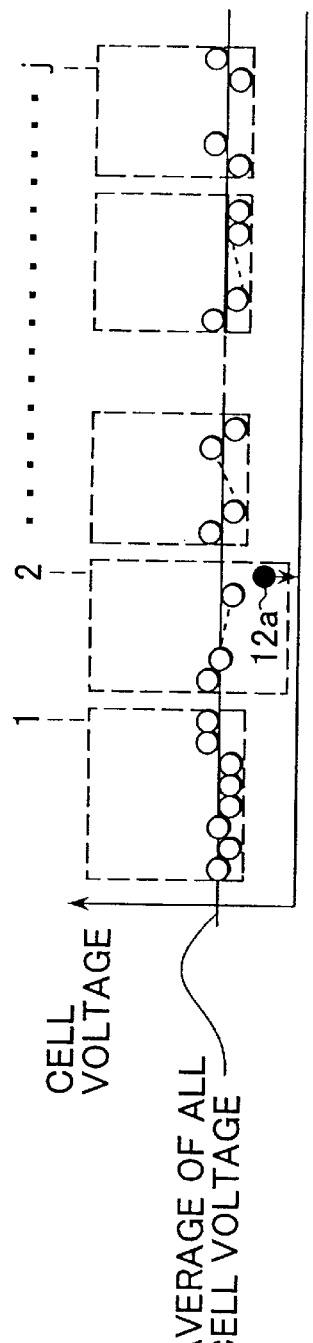

FIGS. 12A–12C shows an example of changes in the voltages at the individual cells achieved through the capacity adjustment control described above.

Let us assume that the cell voltages in individual modules are distributed as shown in FIG. 12A at the control start. The cell voltage average Vamin in the lowest-voltage module (with the lowest module voltage value VMIN) is set as the capacity adjustment target value Vg and cells each having a voltage higher than the capacity adjustment target value Vg are discharged over the corresponding adjustment times each determined based upon the difference between the cell voltage and the capacity adjustment target value Vg. After the adjustment achieved through the discharge, almost all the cell voltages are adjusted close to the level of the average of the voltages at all the cells as shown in FIG. 12B.

If the cell 12a indicated by the filled circle in FIG. 12A manifests a voltage reduction which is within the normal range but large relative to the voltage reductions at a majority of remaining cells, the voltage at the cell 12a indicated by the filled circle is lowered by a greater degree than the voltages at the majority of remaining cells, as shown in FIG. 12B.

The module containing the cell 12a (module 2) indicated by the filled circle at which the voltage has been lowered to a greater degree than the voltages at the other cells is the lowest-voltage module in the state illustrated in FIG. 12B. The cell voltage average Vamin' at this lowest-voltage module is set as the capacity adjustment target value Vg for the next adjustment. Subsequently, as in the process described earlier, cells having voltages higher than the newly set capacity adjustment target value Vg are discharged over the corresponding adjustment times each determined based upon the difference between the cell voltage and the capacity adjustment target value vg.

Since the voltage reduction at the cell 12a is larger than the voltage reductions occurring at the majority of remaining cells, the cell voltage average at the module containing the cell 12a is set as the capacity adjustment target value Vg for the subsequent adjustment. As illustrated in FIG. 12C, through repeated capacity adjustment implemented by sequentially updating the capacity adjustment target value Vg, the voltage at the cell 12a is adjusted to a level close to the level of the voltages at the majority of remaining cells. Thus, since the voltage at the cell 12a becomes closer to the cell average voltage used as a reference in the cell error decision-making, the cell 12a manifesting a voltage reduction which is larger than those at the majority of remaining cells but still is within the normal range is not mistakenly judged to be faulty.

Figure 13A:
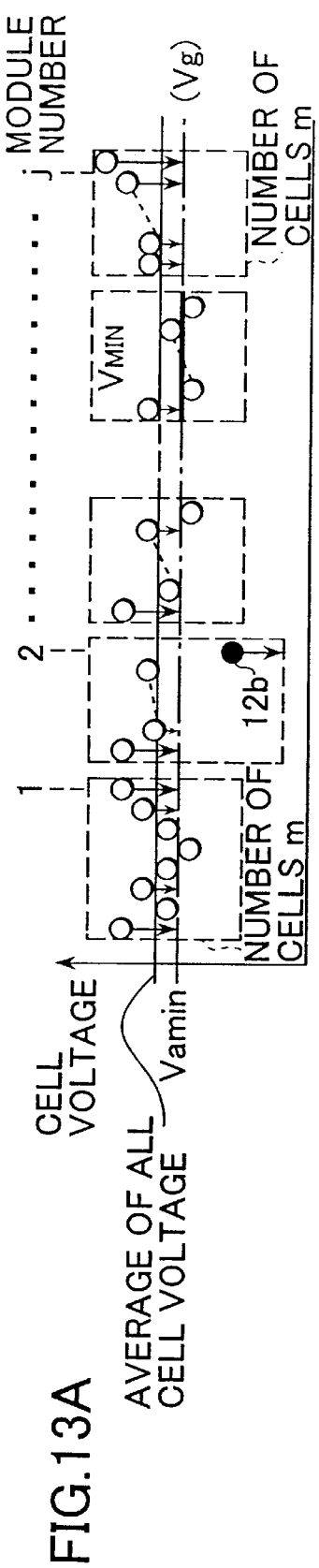
FIGS. 13A~13C show changes in the voltages at the cells achieved when there is a cell manifesting an abnormal voltage reduction.
Figure 13B:
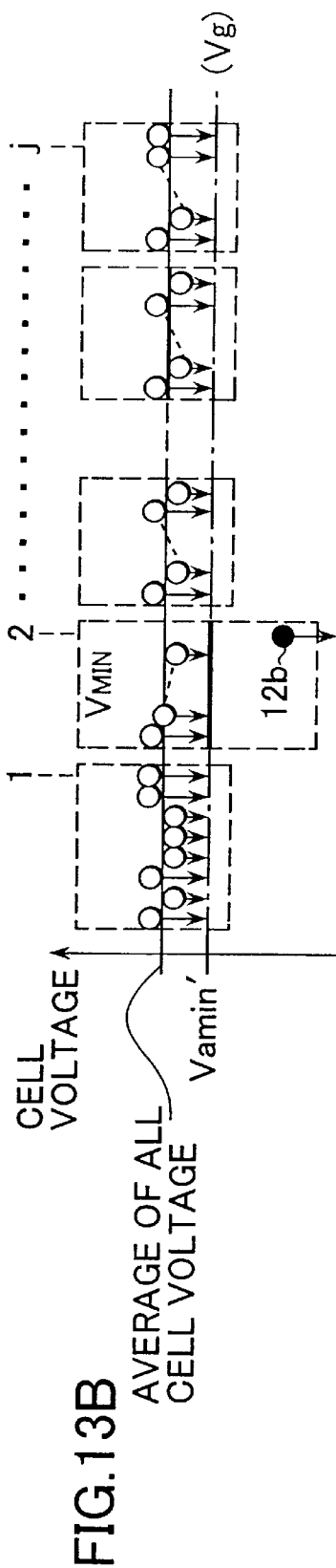

Now, an explanation is given on a situation in which voltage reduction has occurred to an abnormal extent at the cell 12b indicated by the filled circle in FIG. 13A. Even if a module which does not include the cell 12b is the lowest-voltage module prior to the adjustment, the module that includes the cell 12b is used as the lowest-voltage module in the subsequent adjustment due to the great voltage reduction of the cell 12b as shown in FIG. 13B. In the next adjustment, the cell voltage average Vamin' of this lowest-voltage module is set as the capacity adjustment target value Vg.

Figure 13C:
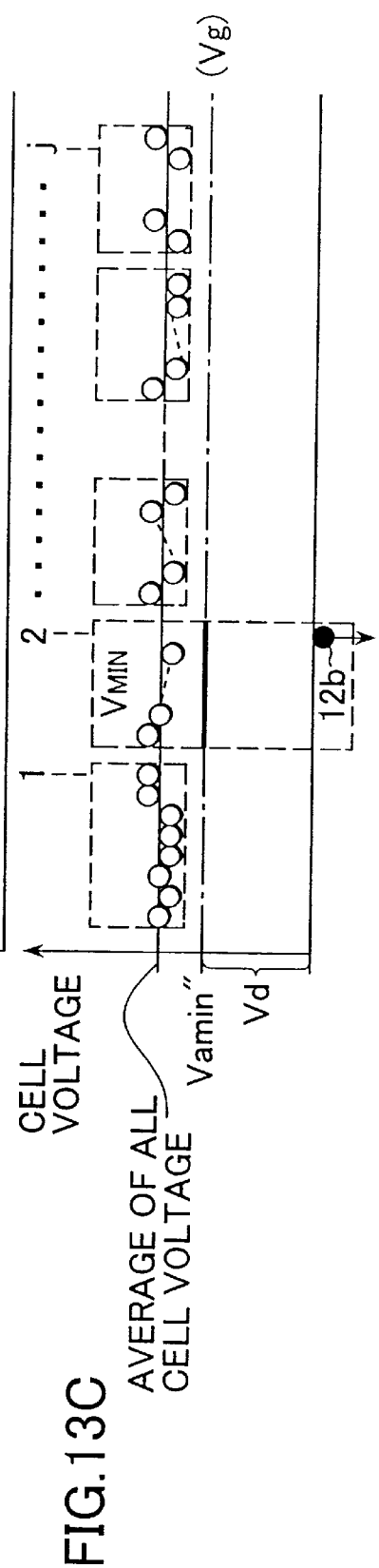

However, the voltage at the cell 12b indicated by the filled circle continuously falls even while cells with voltages higher than the capacity adjustment target value Vg are being discharged. Thus, even though the module including the cell 12b is still the lowest-voltage module after discharging the individual cells, the difference between the cell voltage average Vamin" and the voltage at the cell 12b exceeds the abnormal voltage reduction decision-making threshold value Vd as shown in FIG. 13C.

Consequently, the abnormal voltage reduction is detected with a high degree of reliability.

Figure 14A:
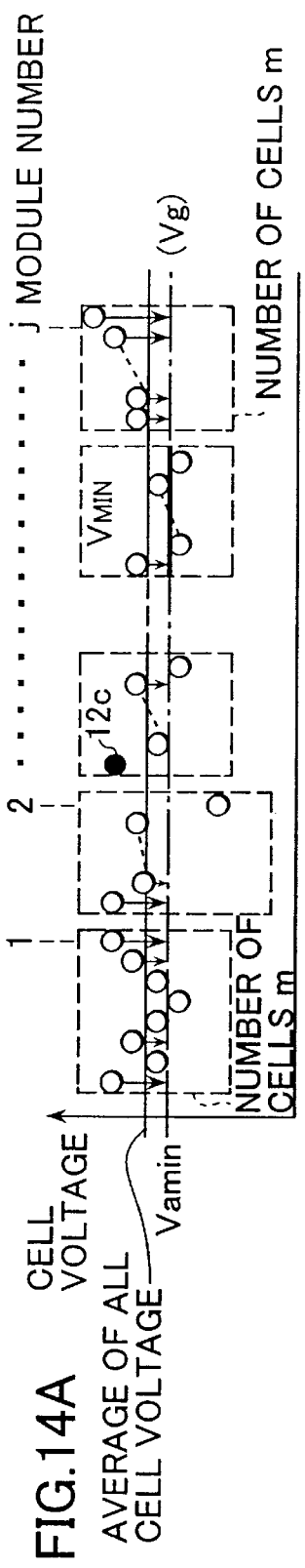
FIGS. 14A~14C show changes in the voltages at the cells achieved when there is a cell manifesting a capacity adjustment function error.

Now, consideration will be made on a situation in which a capacity adjustment function error has occurred due to, for instance, a trouble in the capacity adjustment discharge circuit 14 of a cell 12c indicated by the filled circle in FIG. 14A. The lowest-voltage module among the modules is detected and the cell voltage average Vamin in the lowest-voltage module is set as the capacity adjustment target value Vg. By discharging cells with voltages higher than the capacity adjustment target value Vg over the corresponding individual specific adjustment times, the voltages at a majority of cells are adjusted to a substantially uniform level as shown in FIG. 14B, with an exception of the voltage at the cell 12c which remains above the uniform level since the cell 12c is not discharged.

Figure 14B:
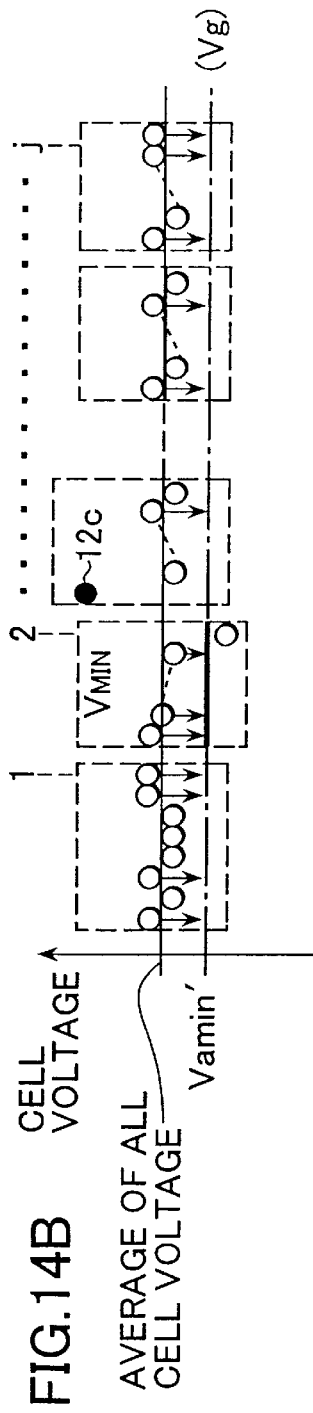
Figure 14C:
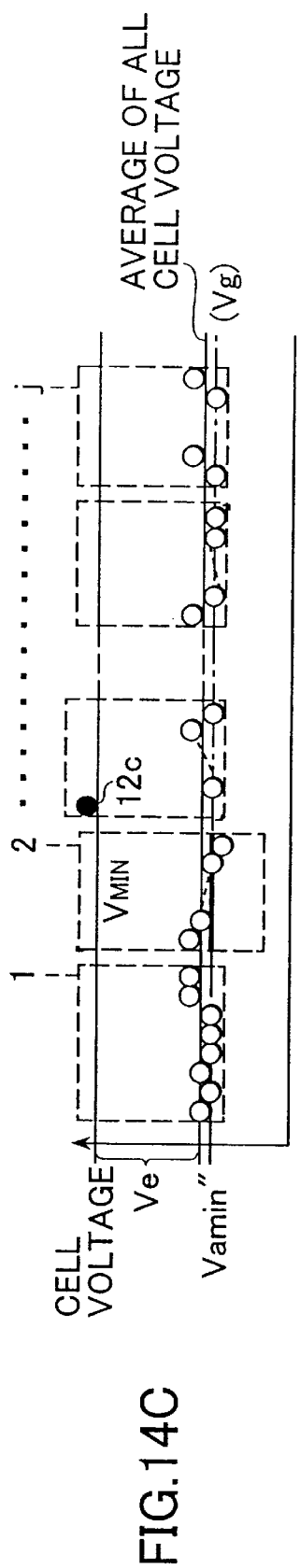
Figure 15A:
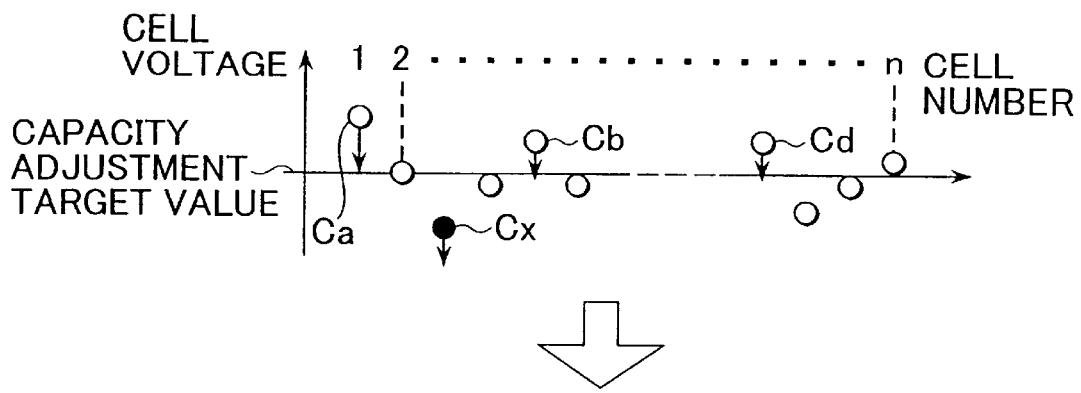
FIGS. 15A–15C show changes in the voltages at cells manifesting in an example of the earlier technology.
Figure 15B:
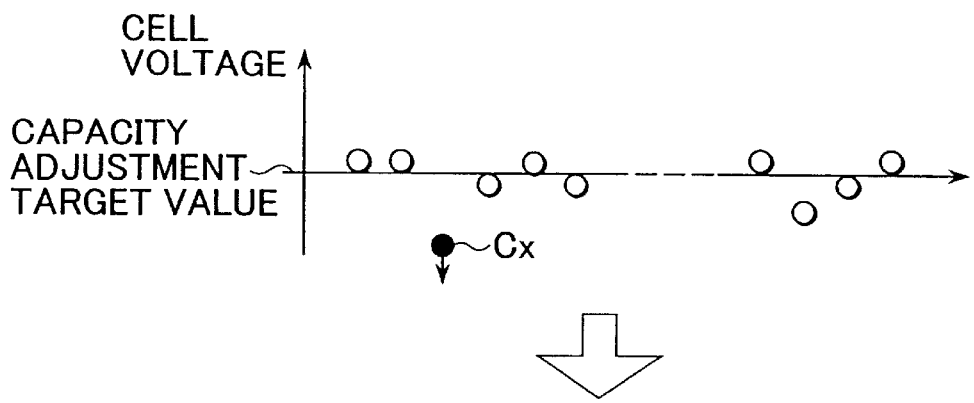
Figure 15C:
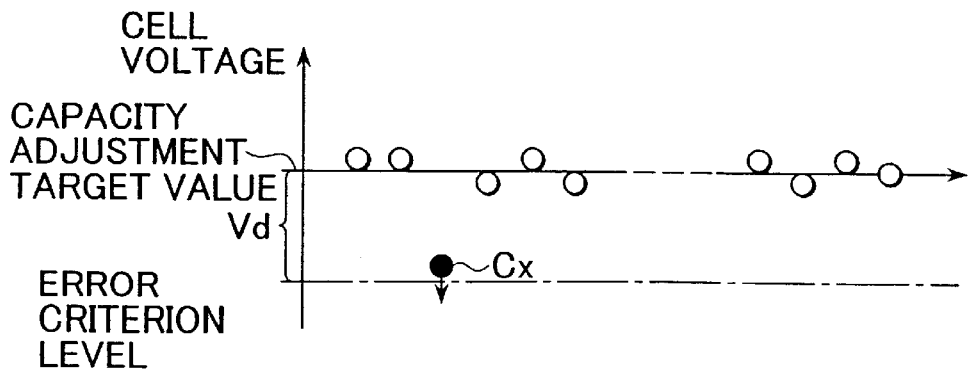
Figure 16A:
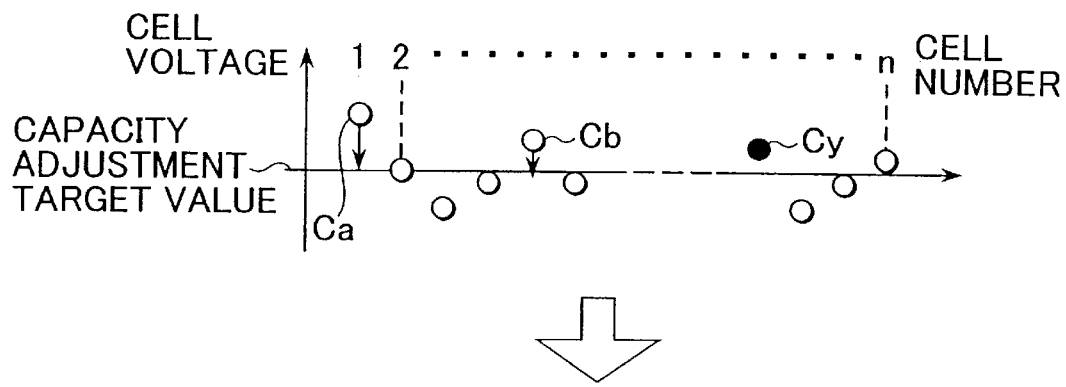
FIGS. 16A–16C show changes in the voltages at the cells observed in the example of the ealier technology when there is a cell manifesting a capacity adjustment function in error.
Figure 16B:
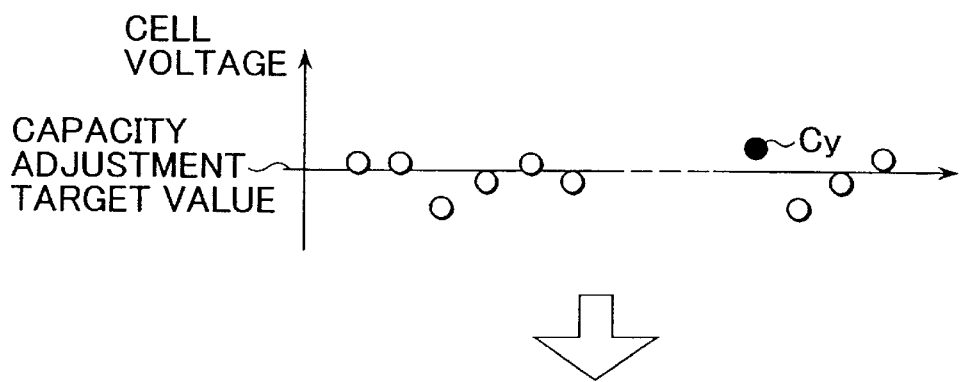
Figure 16C:
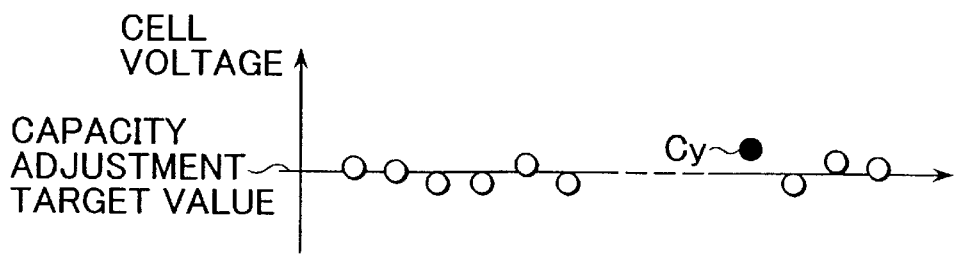

By implementing a further capacity adjustment with the cell voltage average Vamin' of the lowest-voltage module in the state shown and FIG. 14B as the capacity adjustment target value Vg in a similar manner, the average voltage of the voltages at cells excluding the cell 12c is lowered. As a result, the difference between the voltage at the cell 12c and the cell voltage average in the lowest-voltage module increases. When the difference between the voltage at the cell 12c and the cell voltage average Vamin" exceeds the capacity adjustment function error decision-making threshold value Ve as shown in FIG. 14C, a capacity adjustment function error is detected.

The battery pack in the second embodiment is constituted as described above. In the battery pack 10A constituted by connecting in series multiple modules 11 each having multiple cells 12, the cell voltage average of the lowest-voltage module is set as the capacity adjustment target value Vg. The capacity adjustment discharge circuit 14 provided in conjunction with each cell is turned on over the adjustment discharge time Tc corresponding to the deviation of the cell open circuit voltage from the capacity adjustment target value Vg. Since only the cells with voltages exceeding the capacity adjustment target value vg are discharged, the voltages at the individual cells are adjusted to a uniform level promptly regardless of whether a charge or a discharge in the battery pack is in progress. During this process, the capacity inconsistency is adjusted to be contained within a normal range without resulting in excessive capacity discharge.

In addition, Since it is judged that an error has occurred when the deviation of the voltage at each of the cells from the cell voltage average at the lowest-voltage module exceeds a predetermined threshold value, a cell manifesting a voltage reduction which is larger than those at the majority of remaining cells but is still within the normal range is not mistakenly determined to be abnormal. Likewise, a cell manifesting a capacity adjustment function error due to a trouble in its capacity adjustment discharge circuit, too, is detected with high reliability. As a result, it is not necessary to provide a separate detection system and, in addition, the failure diagnostics can be simplified.

Furthermore, since a cell controller is provided for each module so that the cell voltage detection and the discharge achieved through control on the capacity adjustment discharge circuits are executed in parallel with the processing for the other modules, the overall length of processing time is reduced. Consequently, the control flow can be repeated over short cycles, thereby increasing the frequency of capacity adjustment and achieving smoother changes in the individual cell voltages.

The present invention is not limited to the embodiments described above and a number of variations of the embodiments are possible.

The disclosures of the following priority applications are herein incorporated by reference:

Japanese Patent Application No. 2000-194121, filed Jul. 28, 2000,

Japanese Patent Application No. 2000-194122, filed Jul. 28, 2000.

What is claimed is:

1. A method of implementing a capacity adjustment on a battery pack constituted by connecting in series multiple cells with a discharge circuit provided for each cell comprising a discharge process including;

monitoring open circuit voltages at individual cells over specific time intervals;

setting the characteristic value of the open circuit voltages at individual cells monitored over the specific time intervals as a capacity adjustment target value;

determining the length of the adjustment discharge time for each cell based upon the capacity adjustment target value and the open circuit voltage of the cell; and discharging the cell over the length of the adjustment discharge time, wherein;

said discharge process is executed repeatedly.

2. A method of implementing a capacity adjustment on a battery pack constituted by connecting in series multiple cells with a discharge circuit provided for each cell comprising a discharge process including;

monitoring open circuit voltages at individual cells over specific time intervals;

setting the value of a lowest-voltage among the open circuit voltages at individual cells monitored over the specific time intervals as a capacity adjustment target value;

determining the length of adjustment discharge time for each cell based upon the capacity adjustment target value and the open circuit voltage of the cell; and discharging the cell over the length of adjustment discharge time, wherein;

the above discharge process is executed repeatedly.

3. A method of implementing capacity adjustment on a battery pack according to claim 1, wherein;

a cell voltage average obtained by calculating the voltage excluding a lowest-voltage value and a highest-voltage value among the monitored open circuit voltages at the cells is set as a cell error decision-making reference value;

a decision is made as to whether or not the difference between the cell error decision-making reference value and the open circuit voltage at each of the cells exceeds a specific threshold value; and a cell manifesting the difference exceeding the threshold value is judged to be abnormal.

4. A method of implementing capacity adjustment on a battery pack according to claim 3, wherein;

a detection is performed to ascertain whether or not there is a cell with an open circuit voltage lower than the cell error decision-making reference value;

a decision is made as to whether or not the difference between the cell error decision-making reference value and the open circuit voltage at a cell that has been detected exceeds the threshold value; and a cell with the difference exceeding the threshold value is judged to be an abnormal voltage reduction cell.

5. A method of implementing capacity adjustment on a battery pack according to claim 3, wherein;

a detection is performed to ascertain whether or not there is a cell with an open circuit voltage higher than the error decision-making reference value;

a decision is made as to whether or not the difference between the cell error decision-making reference value and the open circuit voltage at a cell that has been detected exceeds the threshold value; and a cell with the difference exceeding the threshold value is judged to be a capacity adjustment function error cell.

6. A method of implementing capacity adjustment on a battery pack according to claim 3, wherein;

if a cell is judged to be abnormal, the lowest-voltage value among the open circuit voltages at the cells excluding the error-manifesting cell is set as a capacity adjustment target value to be used in a subsequent adjustment.

7. A method of implementing capacity adjustment on a battery pack constituted by connecting in series multiple modules each having multiple cells connected in series with a discharge circuit provided for each cell, comprising a discharge process including;

monitoring open circuit voltages at individual cells over specific time intervals;

calculating a module voltage representing a sum of the open circuit voltages monitored over the specific time intervals at the cells constituting said modules for each module;

calculating a cell voltage average of a module with a lowest-voltage value among all the module voltages and setting the cell voltage average of a module as a capacity adjustment target value;

determining the length of the adjustment discharge time based upon the capacity adjustment target value and the open circuit voltage at each cell; and discharging the cell over the adjustment discharge time, wherein;

said discharge process is executed repeatedly.

8. A method of implementing capacity adjustment on a battery pack according to claim 7, wherein;

a cell voltage average in a module having a lowest value of the module voltage value is calculated and set as a cell error decision-making reference value; and a cell with a difference between the open circuit voltage of the cell to be judged and the cell error decision-making reference value exceeding a specific threshold value is judged to be abnormal.

9. A method of implementing capacity adjustment on a battery pack according to claim 8, wherein;

a detection is performed to ascertain whether or not there is a cell with an open circuit voltage lower than the cell error decision-making reference value;

a decision is made as to whether or not the difference between the cell error decision-making reference value and the open circuit voltage at a cell that has been detected exceeds the threshold value; and a cell with a difference exceeding the threshold value is judged to be an abnormal voltage reduction cell.

10. A method of implementing capacity adjustment on a battery pack according to claim 8, wherein;

a detection is performed to ascertain whether or not there is a cell with an open circuit voltage higher than the cell error decision-making reference value;

a decision is made as to whether or not the difference between the cell error decision-making reference value and the open circuit voltage at a cell that has been detected exceeds the threshold value; and a cell with the difference exceeding the threshold value is judged to be a capacity adjustment function error cell.

11. A method of implementing capacity adjustment on a battery pack according to claim 7, wherein;

a detection of the cell open circuit voltages and a discharge to achieve capacity adjustment are executed in parallel for individual modules.

12. An apparatus for implementing capacity adjustment on a battery pack having multiple cells connected in series and discharge circuits provided to achieve discharge at individual cells, comprising;

a monitoring circuit that monitors open circuit voltages of individual cells over specific time intervals;

an arithmetic operation circuit that sets a characteristic value among the open circuit voltages of the individual cells monitored by said monitoring circuit as a capacity adjustment target value and calculates the length of the adjustment discharge time for the cells based upon the capacity adjustment target value and the open circuit voltage of the cells, and a capacity adjustment control circuit that discharges the cells via said discharge circuits over the adjustment discharge times calculated by said arithmetic operation circuit.

13. An apparatus for implementing a capacity adjustment on a battery pack having multiple cells connected in series and a discharge means provided to achieve discharge at individual cells, comprising;

a means of monitoring open circuit voltages of individual cells over specific time intervals;

an arithmetic means of setting a characteristic value among the open circuit voltages of the individual cells monitored by said monitoring means as a capacity adjustment target value and calculating the length of the adjustment discharge time for the cells based upon the capacity adjustment target value and the open circuit voltage of the cells, and a capacity adjustment control means for discharging the cells via said discharge means over the adjustment discharge times calculated by said arithmetic means.

14. An apparatus for implementing capacity adjustment on a battery pack having multiple cells connected in series and discharge circuits provided to achieve discharge at individual cells, comprising;

a monitoring circuit that monitors open circuit voltages of individual cells over specific time intervals;

an arithmetic operation circuit that sets a lowest-voltage value among the open circuit voltages of the individual cells monitored by said monitoring circuit as a capacity adjustment target value and calculates lengths of adjustment discharge times for the cells based upon the capacity adjustment target value and the open circuit voltage of the cells, and a capacity adjustment control circuit that discharges the cells via said discharge circuits over the adjustment discharge times calculated by said arithmetic operation circuit.

15. An apparatus for implementing capacity adjustment on a battery pack having multiple modules connected in series with each module constituted by connecting in series multiple cells and discharge circuits provided to achieve discharge at individual cells, comprising;

a monitoring circuit that monitors open circuit voltages at the individual cells over specific time intervals;

an arithmetic operation circuit that calculates a module voltage representing a sum of the open circuit voltages at the cells constituting each of said modules based upon the open circuit voltages at the cells monitored by said monitoring circuit, sets a voltage average of voltages at cells constituting a module with a lowest-voltage value among multiple module voltages as a capacity adjustment target value and calculates lengths of adjustment discharge times for individual cells based upon the capacity adjustment target value and the open circuit voltages at the cells; and a capacity adjustment discharge circuit that discharges the cells via said discharge circuits over the adjustment discharge times calculated by said arithmetic operation circuit.

16. A method of implementing capacity adjustment on a battery pack constituted by connecting in series multiple cells with a discharge circuit provided for each cell, comprising a discharge process including;

monitoring open circuit voltages at individual cells over specific time intervals;

setting the value of a lowest-voltage among the open circuit voltages of the individual cells monitored over specific time intervals as a capacity adjustment target value;

setting an average voltage obtained by calculating the average voltage after excluding the lowest-voltage and the highest voltage among the open circuit voltages at the cells as a cell error decision-making reference value;

monitoring whether or not there is a cell with an open circuit voltage lower than the cell error decision-making value;

deciding whether or not the difference between the cell error decision-making reference value and the open circuit voltage of a cell that has been detected exceeds a first threshold value;

judging whether or not a cell manifesting the difference exceeding the first threshold value has an abnormal voltage reduction cell;

monitoring whether or not there is a cell with an open circuit voltage higher than the error decision-making reference value;

deciding whether or not the difference between the cell error decision-making reference value and the open circuit voltage of a cell that has been detected exceeds a second threshold value;

judging whether or not the cell with the difference exceeding the second threshold value has a capacity adjustment function error cell;

setting the lowest-voltage among the open circuit voltages at cells excluding the error-manifesting cell as a next capacity adjustment target value;

determining the length of adjustment discharge time for each cell based upon the capacity adjustment target value and the open circuit voltage of the cell; and discharging the cell over the adjustment discharge time, wherein;

said discharge process is executed repeatedly.

17. A method of implementing capacity adjustment on a battery pack constituted by connecting in series multiple modules each having multiple cells connected in series with a discharge circuit provided for each cell comprising a discharge process including;

monitoring open circuit voltages at individual cells over specific time intervals;

calculating a module voltage representing a sum of the open circuit voltages monitored over the specific time intervals at the cells constituting said modules for each module;

calculating a cell voltage average of a module with a lowest-voltage value among all the module voltages and setting the cell voltage average of a module as a capacity adjustment target value and as a cell error decision-making reference value;

monitoring whether or not there is a cell with an open circuit voltage lower than the cell error decision-making reference value;

deciding whether or not the difference between the cell error decision-making reference value and the open circuit voltage of a cell that has been detected exceeds a third threshold value;

judging whether or not a cell with a difference exceeding the third threshold value to be an abnormal voltage reduction cell;

monitoring whether or not there is a cell with an open circuit voltage higher than the cell error decision-making reference value;

deciding whether or not the difference between the cell error decision-making reference value and the open circuit voltage of a cell that has been detected exceeds a fourth threshold value;

judging whether or not a cell with the difference exceeding the fourth threshold value has a capacity adjustment function error cell;

determining the length of adjustment discharge time for each cell based upon the capacity adjustment target value and the open circuit voltage of the cell; and discharging the cell over the adjustment discharge time wherein;

said discharge process is executed repeatedly, concurrently for said modules.

* * * * *